United States Patent
Kurata et al.

(10) Patent No.: US 8,152,227 B2
(45) Date of Patent: Apr. 10, 2012

(54) STRUCTURE OF MOUNTING COWL TOP COVER

(75) Inventors: Takenori Kurata, Fuji (JP); Hirofumi Harada, Fuji (JP); Fumihiko Kimura, Fuji (JP); Toshiyuki Terada, Yokohama (JP); Takahiro Murata, Yokohama (JP); Manabu Fujisawa, Yokohama (JP); Naoki Kobayashi, Yokohama (JP)

(73) Assignee: Nihon Plast Co., Ltd., Fuji-shi (JP)

( * ) Notice: Subject to any disclaimer, the term of this patent is extended or adjusted under 35 U.S.C. 154(b) by 277 days.

(21) Appl. No.: 12/690,215

(22) Filed: Jan. 20, 2010

(65) Prior Publication Data

US 2010/0187862 A1    Jul. 29, 2010

(30) Foreign Application Priority Data

Jan. 23, 2009  (JP) .................................. 2009-13412

(51) Int. Cl.
*B62D 25/08*    (2006.01)
(52) U.S. Cl. ...................... 296/192; 296/208; 296/96.21
(58) Field of Classification Search .................. 296/192, 296/208, 84.1, 96.21, 96.22, 190.1, 201
See application file for complete search history.

(56) References Cited

U.S. PATENT DOCUMENTS

| | | | | |
|---|---|---|---|---|
| 4,679,845 A | * | 7/1987 | Detampel et al. ............. | 296/192 |
| 4,874,198 A | * | 10/1989 | Roller ............................ | 296/192 |
| 5,352,010 A | * | 10/1994 | Brodie et al. ................. | 296/192 |
| 7,182,397 B1 | * | 2/2007 | Desai ............................ | 296/192 |
| 2003/0159875 A1 | * | 8/2003 | Sato et al. ..................... | 180/274 |
| 2005/0179285 A1 | | 8/2005 | Nakajima et al. | |
| 2006/0049669 A1 | * | 3/2006 | Yamamoto .................... | 296/201 |
| 2006/0186704 A1 | * | 8/2006 | Sakai et al. ................... | 296/192 |
| 2006/0202516 A1 | * | 9/2006 | Mori ............................. | 296/192 |
| 2006/0226681 A1 | * | 10/2006 | Kelly ............................ | 296/192 |
| 2008/0211255 A1 | * | 9/2008 | Saito ......................... | 296/96.21 |
| 2009/0146459 A1 | * | 6/2009 | Watanabe et al. ............. | 296/192 |
| 2011/0049933 A1 | * | 3/2011 | Serizawa et al. .............. | 296/192 |
| 2011/0148148 A1 | * | 6/2011 | Desai ............................ | 296/192 |

FOREIGN PATENT DOCUMENTS

| | | |
|---|---|---|
| CN | 1654258 A | 8/2005 |
| JP | H01-144107 U | 10/1989 |
| JP | 3919388 B2 | 5/2007 |

* cited by examiner

*Primary Examiner* — Jason S Morrow
(74) *Attorney, Agent, or Firm* — Marvin A. Motsenbocker; Mots Law, PLLC

(57) ABSTRACT

A structure of mounting a cowl top cover which has a back end portion mounted to a lower end portion of a front windshield panel. The structure includes: a surface portion disposed at the back end portion of cowl top cover, the surface portion covering a surface of lower end portion of front windshield panel and extending in a vehicular widthwise direction; a plurality of clip portions disposed at back end portion of cowl top cover, the lower end portion of front windshield panel being clamped between the clip portions and the surface portion in a plurality of places along the direction in which the surface portion extends; and a thin plate portion disposed at back end portion of cowl top cover, wherein the thin plate portion connecting plurality of clip portions with each other is thinner than surface portion and is spaced apart from front windshield panel.

8 Claims, 24 Drawing Sheets

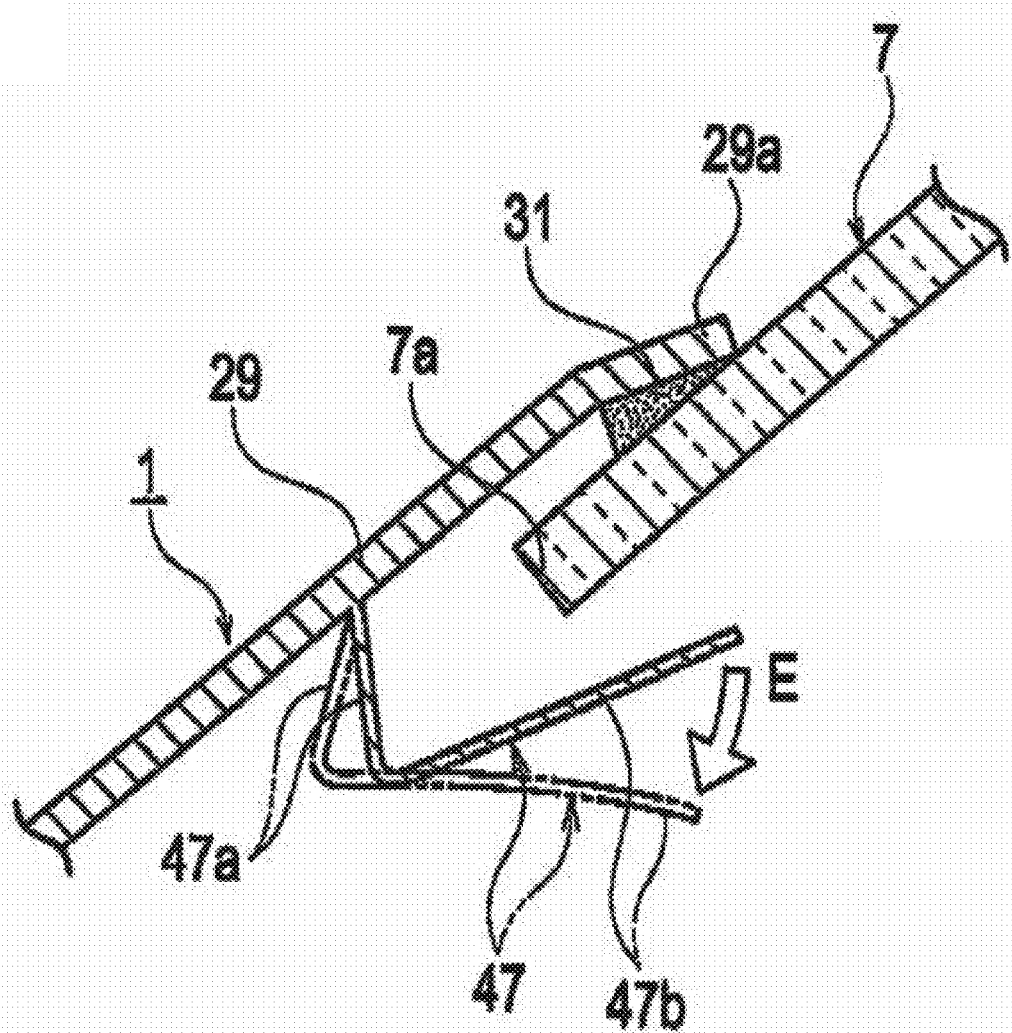

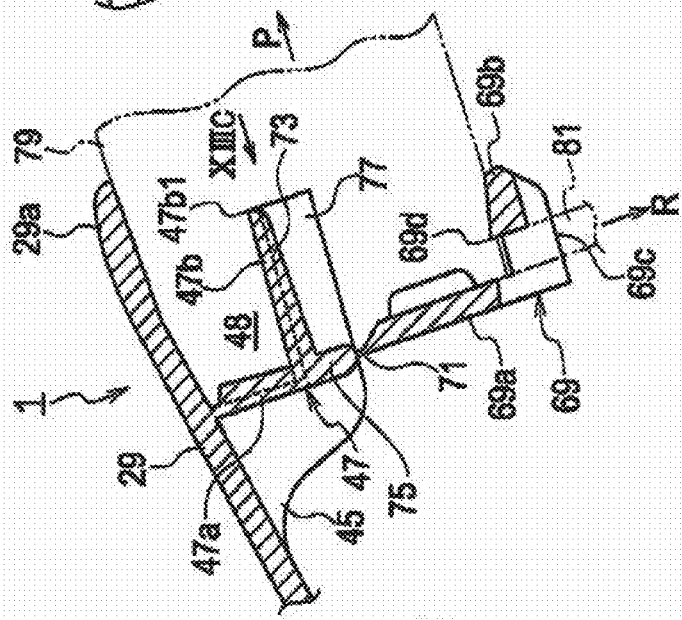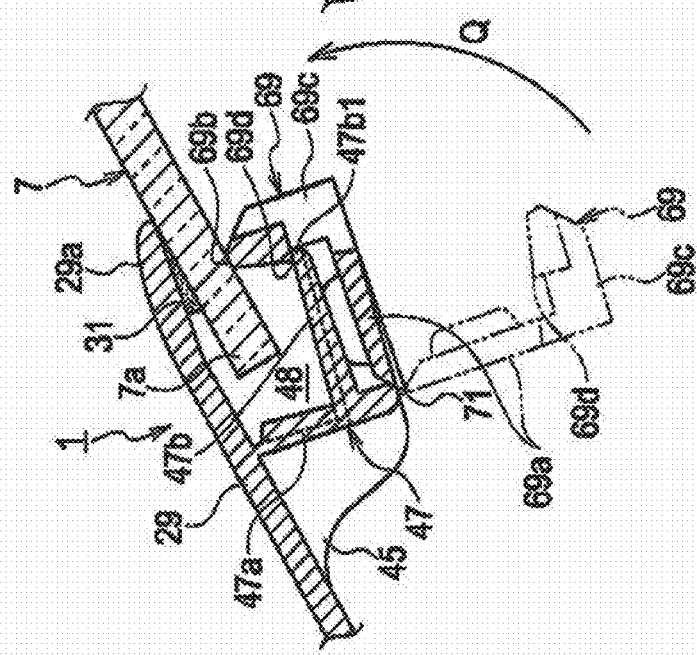

STRUCTURE OF MOUNTING COWL TOP COVER

BACKGROUND OF THE INVENTION

1. Field of the Invention

The present invention relates to a structure of mounting a back end portion of a cowl top cover to a lower end portion of a front windshield panel.

2. Description of the Related Art

A conventional structure of mounting a back end portion of a cowl top cover to a lower end portion of a front windshield panel is known. In the conventional structure, the clips and mating grooves which are disposed at the back end portion of the cowl top cover throughout an entire length in the vehicular widthwise direction are so used as to entirely clamp the lower end portion of the front windshield panel from upper and lower sides throughout the entire length in the vehicular widthwise direction. Refer to Japanese Patent No. 3919388 (equivalent of JP2001030955) and Japanese Utility Model Gazette No. Heisei 1 (1989)-144107.

The above conventional structures of mounting the cowl top covers have the following inconveniences. When integrally forming the cowl top cover by using synthetic resin, a primary shrinkage in the forming is likely to deform the clips and mating grooves which extend throughout the entire length in the vehicular widthwise direction. Moreover, a load (own weight) is applied to the cowl top cover in such occasions as i) volume shrinkage or expansion in temperature change, ii) storage as a single product and transportation as a single product. In these occasions, the above clips and mating grooves are likely to be deformed.

When the cowl top cover's back end portion of mounted to the lower end portion of the front windshield panel is thus deformed, the back end portion does not match with the radius of curvature of the front windshield panel. Such difference in radius of curvature may cause a gap between the cowl top cover and the front windshield panel, which may lead to deterioration of vehicle quality. Forcibly implementing the above mounting with the above gap thus caused may apply an excessive load to the front windshield panel.

SUMMARY OF THE INVENTION

It is an object of the present invention to suppress deformation of a back end portion of a cowl top cover made of synthetic resin, where the back end portion is to be mounted to a front windshield panel.

According to an aspect of the present invention, there is provided a structure of mounting a cowl top cover which has a back end portion mounted to a lower end portion of a front windshield panel. The structure comprises: a surface portion disposed at the back end portion of the cowl top cover, the surface portion covering a surface of the lower end portion of the front windshield panel and extending in a vehicular widthwise direction; a plurality of clip portions disposed at the back end portion of the cowl top cover, the lower end portion of the front windshield panel being clamped between the clip portions and the surface portion in a plurality of places along the direction in which the surface portion extends; and a thin plate portion disposed at the back end portion of the cowl top cover, wherein the thin plate portion connecting the plurality of the clip portions with each other is thinner than the surface portion and is spaced apart from the front windshield panel.

Other objects and features of the present invention will become understood from the following description with reference to the accompanying drawings.

BRIEF DESCRIPTION OF THE DRAWINGS

FIG. 7 explains an operation when a thin plate portion of the cowl top cover is deformed with a load applied to open the thin plate portion relative to a panel portion.

FIG. 9 is a counterpart of FIG. 4A.

FIG. 10A is a perspective view of FIG. 9 while

FIG. 13A is a cross sectional view of a structure not having the water-draining through hole at a clip portion according to a second example, where FIG. 13A is a counterpart of FIG. 4A, FIG. 13B is a cross sectional view showing a state after molding, according to the second example, and FIG. 13C is a view taken in the direction XIIIC in FIG. 13B.

FIG. 14A is a counterpart of FIG. 13A.

FIG. 16A is a counterpart of FIG. 13B.

FIG. 18A is a counterpart of FIG. 13B.

FIG. 20A is a counterpart of FIG. 13B.

FIG. 23 is a cross sectional view which is a counterpart of FIG. 6A.

FIG. 24 is a perspective view which is a counterpart of FIG. 22.

FIG. 25 shows a structure of mounting the cowl top cover, according to a fourth embodiment of the present invention, where

DESCRIPTION OF THE PREFERRED EMBODIMENTS

In the following, various embodiments of the present invention will be described in detail with reference to the accompanying drawings.

For ease of understanding, the following description will contain various directional terms, such as right, left, upper, lower, forward, rearward and the like. However, such terms are to be understood with respect to only a drawing or drawings on which the corresponding part of element is illustrated.

Hereinafter, embodiments of the present invention are to be set forth referring to drawings.

Figure 1:
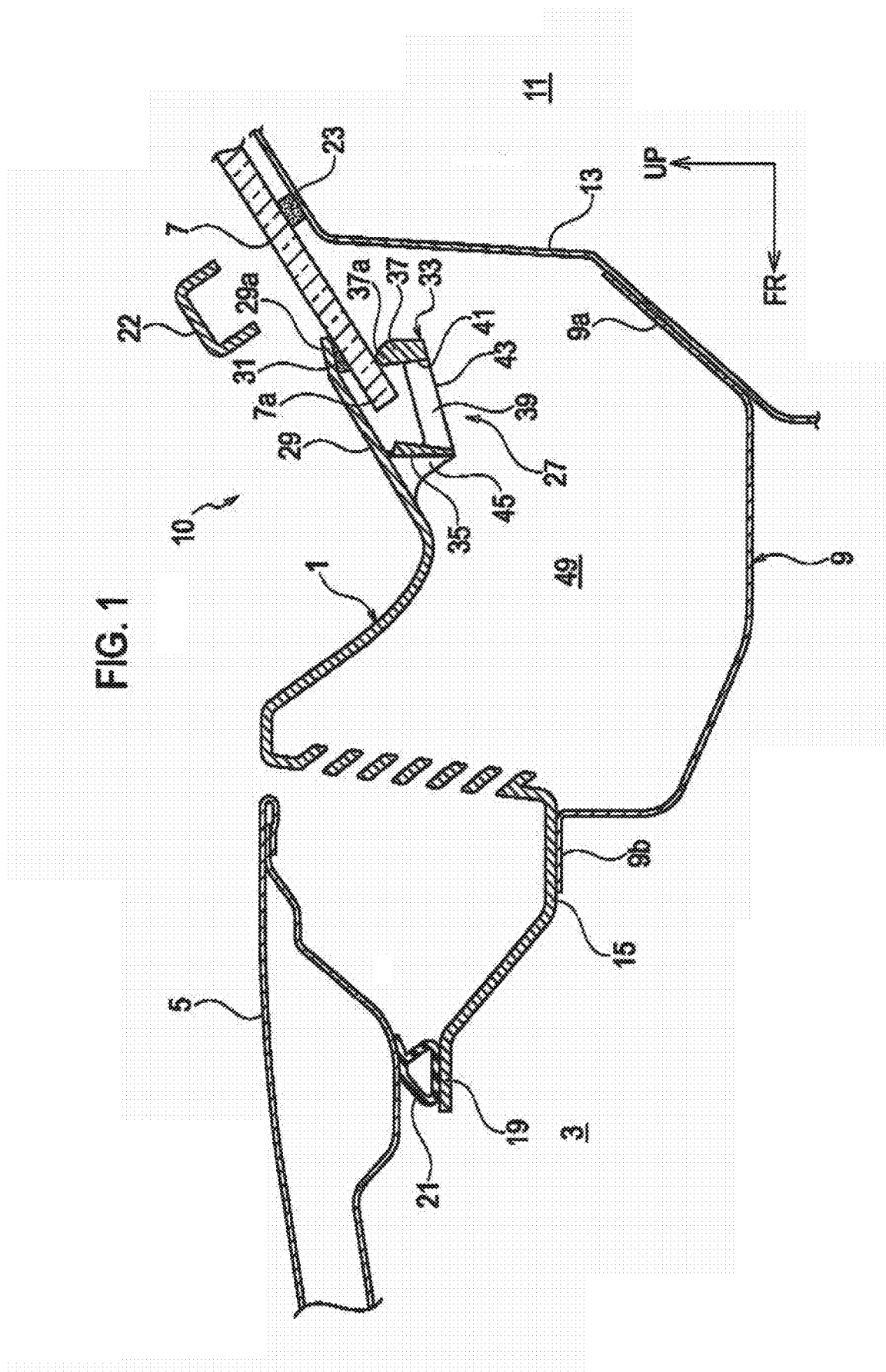
FIG. 1 is a cross sectional view taken along the line I-I in FIG. 2, showing a structure of mounting a cowl top cover, according to a first embodiment of the present invention.

FIG. 1 shows a structure 10 of mounting a cowl top cover 1, according to a first embodiment of the present invention. FIG. 1 is a cross section taken along the line I-I in FIG. 2. In each of the drawings to be set forth hereinafter, arrows FR, UP, LH respectively denote forward, upward and leftward directions of a vehicle 102.

The cowl top cover 1 is integrally formed by a synthetic resin and positioned between a hood 5 and a front windshield panel 7 where the hood 5 covers an upper opening of an engine room 3. The cowl top cover 1 extends in a vehicular widthwise direction. The cowl top cover 1 covers an upper opening of a cowl top panel 9 serving as an air box. The cowl top panel 9 has a vehicular backward end portion 9a and a vehicular forward end portion 9b, where the vehicular backward end portion 9a is mounted to a dash panel 13 for partitioning the engine room 3 from an in-vehicle space 11 while the vehicular forward end portion 9b is mounted to a downward protruding portion 15 on a vehicular forward side of the cowl top cover 1.

Moreover, a sealing rubber 21 is mounted on an end portion 19 on a side more vehicular-forward than the downward protruding portion 15 of the cowl top cover 1. The hood 5, when closed, is pressed on to the sealing rubber 21. Herein, a wiper 22 is disclosed in FIG. 1 and FIG. 2 while the hood 5 disclosed in FIG. 1 is omitted from FIG. 2.

Figure 2:
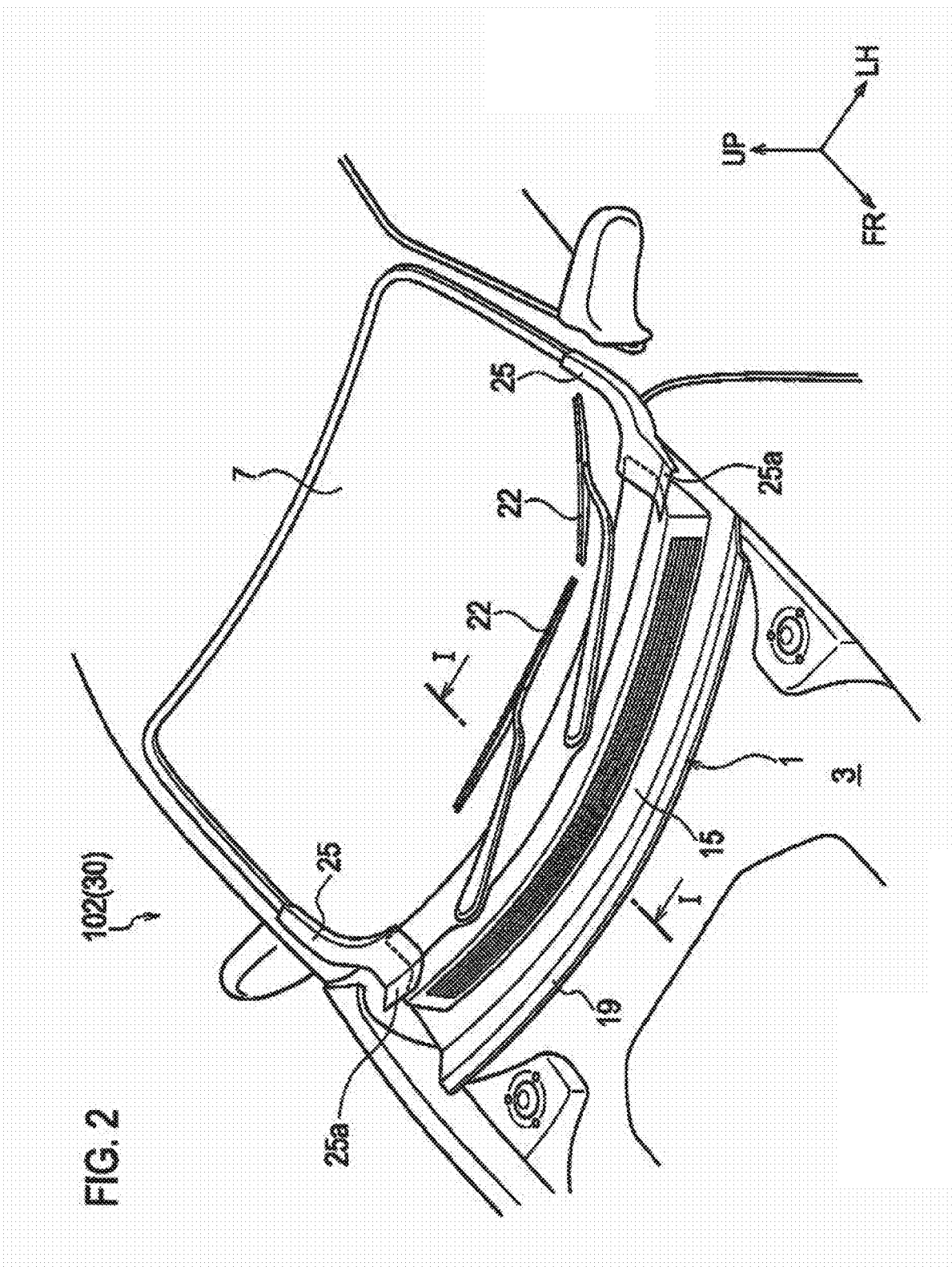
FIG. 2 is a perspective view of a vehicle, showing a periphery of the structure of mounting the cowl top cover in FIG. 1.

On the other hand, the front windshield panel 7 is pressed on to an upper part of the dash panel 13 via a sealant 23. The front windshield panel 7's peripheries other than a lower end portion 7a are fixed to a vehicular body 30. In addition, FIG. 2 shows a fender cover 25 having a lower end portion 25a which is mounted to the vehicular body 30 as to cover the cowl top cover 1's upper part on the vehicular back end side at either end in the vehicular widthwise direction.

Then, herein after set forth is configuration of a back end portion 27 of the cowl top cover 1, where the back end portion 27 is mounted to the lower end portion 7a of the front windshield panel 7.

Figure 3:
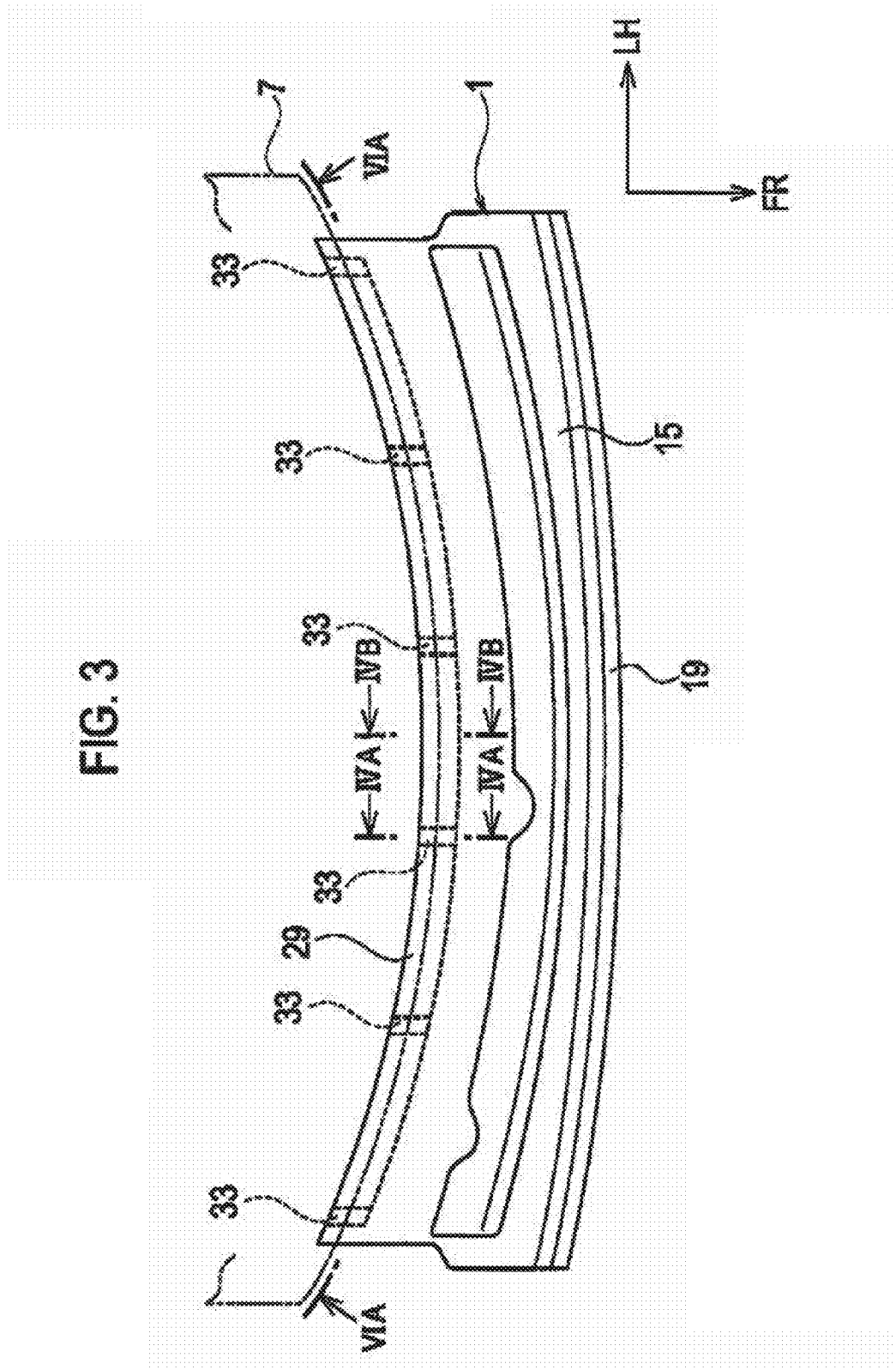
FIG. 3 is a plan view of a single product of the cowl top cover in FIG. 1.
Figure 4A:
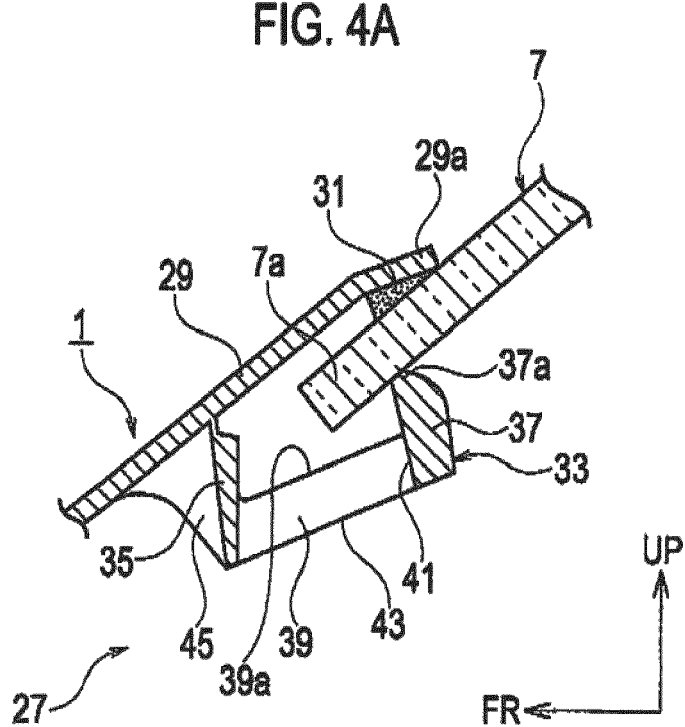
FIG. 4A shows a cross section taken along the line IVA-IVA in FIG. 3
Figure 4B:
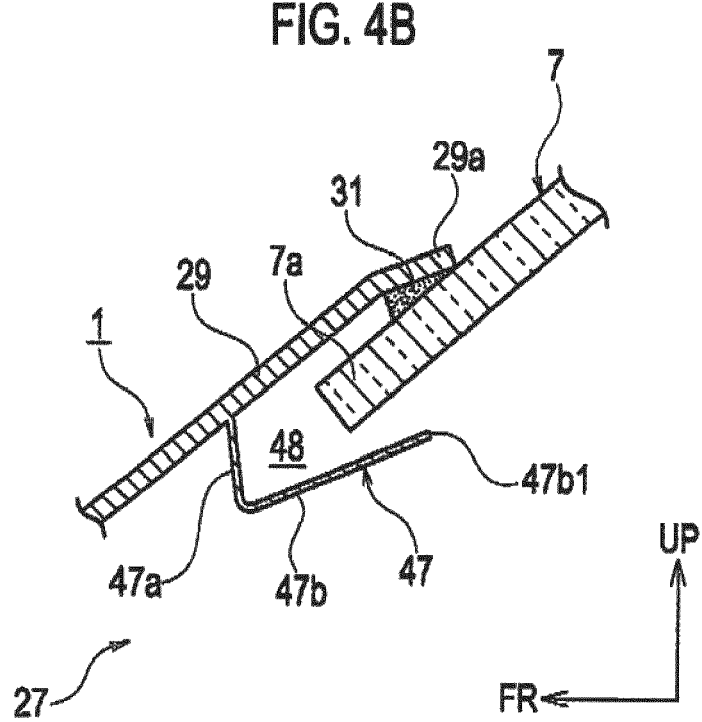
FIG. 4B shows a cross section taken along the line IVB-IVB in FIG. 3.

FIG. 3 is a plan view of a single product of the cowl top cover 1. FIG. 4A shows a cross section taken along the line IVA-IVA in FIG. 3 and also is an enlarged view of the back end portion 27 in FIG. 1. FIG. 4B shows a cross section taken along the line IVB-IVB in FIG. 3. Herein, each of the cross section IVA-IVA and the cross section IVB-IVB in FIG. 3 is rotated clockwise by about 90° to match with a vehicular horizontal direction.

As shown in FIG. 4A, the back end portion 27 of the cowl top cover 1 is provided with a panel portion 29 as a surface portion which is, as a whole, inclined substantially in parallel with the front windshield panel 7, such that the back end portion 27's vehicular backward side is higher in the horizontal direction than the back end portion 27's vehicular forward side. The panel portion 29 extends throughout the entire length in the vehicular widthwise direction. An area around a back end 29a of the panel portion 29 is somewhat bent inward to thereby contact a surface of the front windshield panel 7. In this configuration, a sealant 31 is disposed between the panel portion 29 (in the vicinity of this contact) and the front windshield panel 7.

Below each of a plurality of portions in proper positions in the vehicular widthwise direction of the panel portion 29, a clip part 33 to be mounted to the lower end portion 7a is provided integrally with the panel portion 29, such that the lower end portion 7a of the front windshield panel 7 is clamped between the panel portion 29 and the clip portion 33. The clip portion 33 includes a front wall 35 extending below a lower face of the panel portion 29 continuously with the lower face, a back wall 37 disposed backward relative to the front wall 35 and having a tip end contact portion 37a adapted to contact a backface of the front windshield panel 7, and a pair of left and right side wall portions 39 connecting, in the vehicular fore-and-aft direction, the front wall 35 and back wall 37's both ends (on the lower side) in the vehicular widthwise direction to thereby accomplish an integration.

Figure 5:
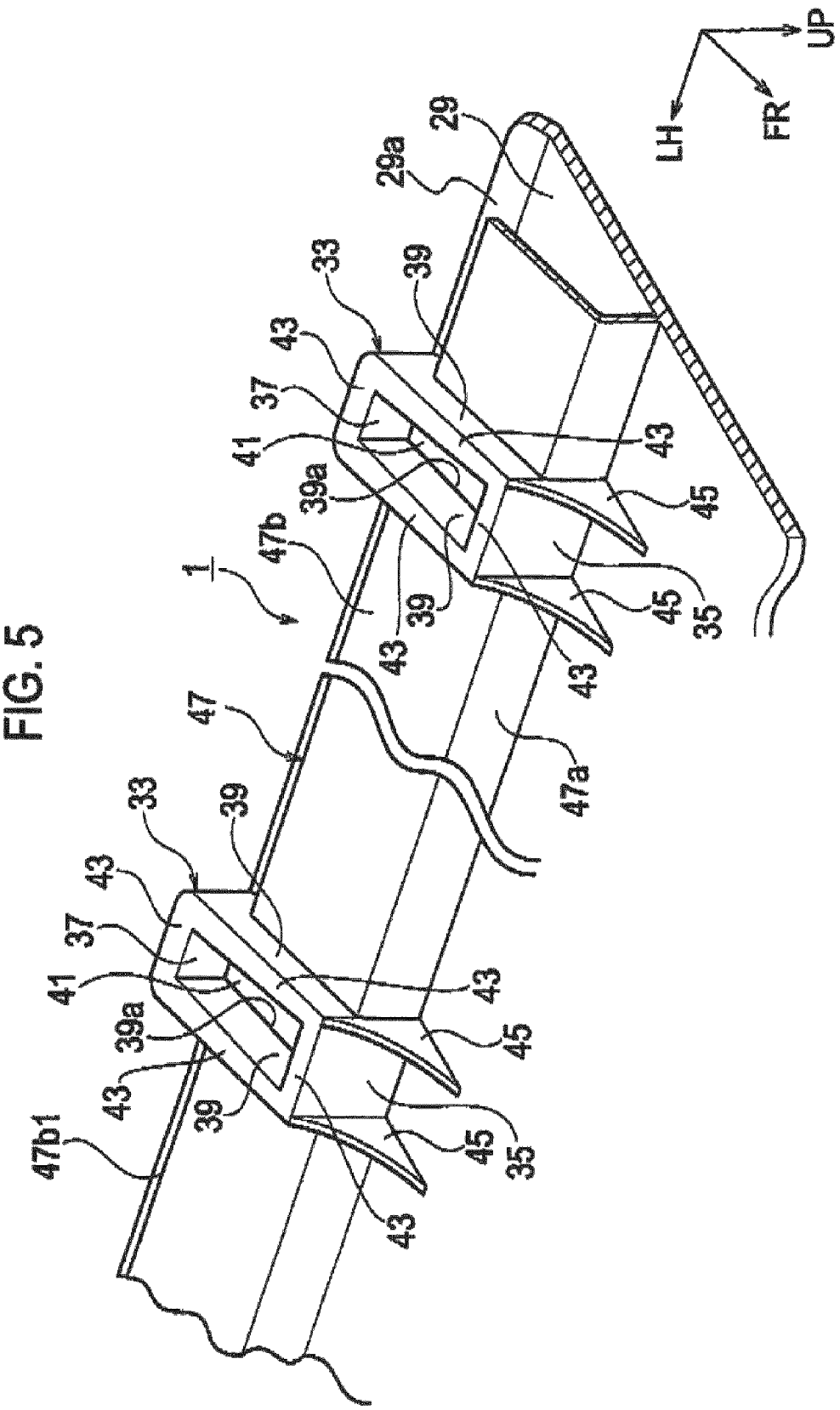
FIG. 5 is a perspective view from backside, showing a part of the cowl top cover in FIG. 1.

Combining the front wall 35, the back wall 37 and a pair of side wall portions 39, the clip portion 33 forms therein a through hole 41 as a water draining hole which is a substantially rectangular parallelepiped and extends through in the horizontal direction, as is seen in FIG. 5 which is a perspective view showing a part of the cowl top cover 1 from backside. In addition, lower end faces of the front wall 35, the back wall 37 and a pair of side wall portions 39 are formed with base faces 43 which are flush with each other. The flush base face 43 is stepless and smooth and has such a configuration that the vehicular forward side of the base face 43 is lower than the vehicular backward side of the base face 43.

In addition, FIG. 4A and FIG. 5 each show a reinforcing rib 45.

Moreover, a plurality of the clip portions 33 are set at proper intervals in the vehicular widthwise direction. Between the clip portions 33, there Is provided a thin plate portion 47 which connects the clip portions 33 with each other and is formed with a thin material which is thinner than that of the panel portion 29. The thin plate portion 47 includes a front wall 47a and a base wall 47b to thereby have a cross section formed into a substantially alphabetical L, where the front wall 47a extends downward from a lower face of the panel portion 29 substantially in parallel with the front wall 35 of the clip portion 33 while the base wall 47b extends from a lower end of the front wall 47a in the vehicular backward direction substantially in parallel with the base face 43 of the clip portion 33. A back end 47b1 of the base wall 47b, including an entirety of the base wall 47b, is spaced apart from the front windshield panel 7, as shown in FIG. 4B.

The thin plate portion 47's end portion in the vehicular widthwise direction is continuous with an upper end 39a of the side wall portion 39 of the clip portion 33. As such, an upper space 48 of the thin plate portion 47 shown in FIG. 4B is continuous with the through hole 41 of the clip portion 33.

Figure 6A:
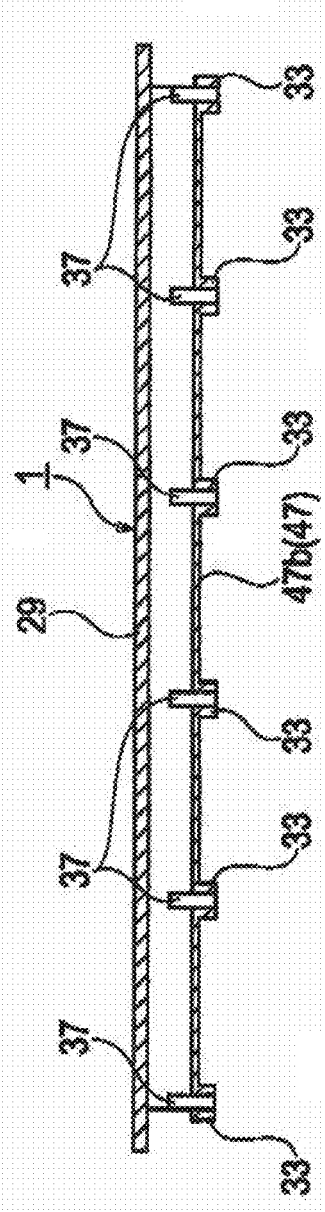
FIG. 6A is a cross sectional view taken along the line VIA-VIA in FIG. 3, FIG. 6B explains an operation when an upper face of the cowl top cover is curved concave, relative to FIG. 6A, and FIG. 6C explains an operation when the upper face of the cowl top cover is curved convex, relative to FIG. 6A.
Figure 6B:
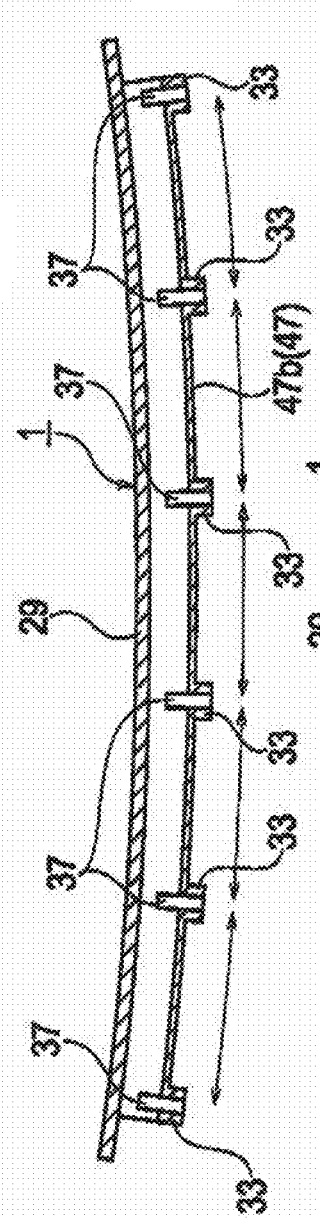

Then, functions of the cowl top cover 1 mentioned above are to be set forth. FIG. 6A is a cross sectional view taken along the line VIA-VIA in FIG. 3, showing a natural state that the cowl top cover 1 is free from a load. From this natural state, a load (own weight) is applied to the cowl top cover 1 in such occasions as i) volume shrinkage or expansion in temperature change, ii) storage as a single product, and iii) transportation as a single product. In these occasions, the cowl top cover 1 is likely to be deformed by the load applied to the entirety of the cowl top cover 1 in a warping direction such that an upper face of the panel portion 29 is curved concave, as shown in FIG. 6B. In this case, a tensile strength of the material of the thin plate portion 47 prevents a deformation against the above likely deformation such that the thin plate portion 47 tightens an area between the clip portions 33.

Since the thin plate portion 47 has a strong tensile strength in view of material characteristics, the thin plate portion 47 which is even literally thin can bring about a sufficient resistance to the above deformation.

Figure 6C:
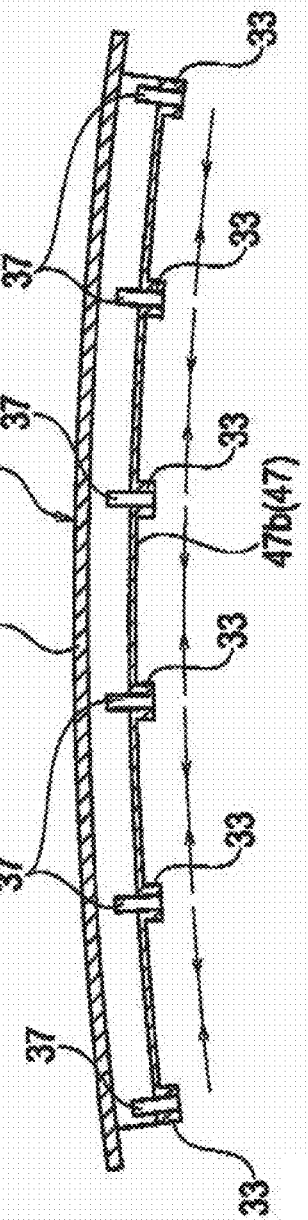

On the other hand, the cowl top cover 1 is likely to be deformed by the load applied to the entirety of the cowl top cover 1 in a closing direction opposite to the warping direction such that the upper face of the panel portion 29 is curved convex, as shown in FIG. 6C. In this case, the thin plate portion 47 functions as a supporting rod between the clip portions 33. Thereby, a compressive strength of the material of the thin plate portion 47 can prevent a deformation against the above likely deformation.

In this case, allowing the thin plate portion 47 to have a cross section substantially into an alphabetical L by a combination of the front wall 47a and the base wall 47b can increase a buckling strength, thus bringing about a power sufficient to resist against the above deformation.

The thin plate portion 47 bringing about the above functions can maintain the configuration of the cowl top cover 1's part to mate with the front windshield panel 7, thus suppressing deformation of the back end portion 27 of the cowl top cover 1.

Moreover, the cowl top cover 1 according to the first embodiment, when being formed integrally by using synthetic resin, the clip portions 33 are mutually connected by means of the thin plate portion 47 thereby forming a long piece product continuous in the vehicular widthwise direction and maintaining rigidity of product while maintaining the thin plate portion 47 thinner than the panel portion 29. As such, compared with a counterpart cowl top cover 1 having such a configuration that a part corresponding to the thin plate portion 47 is as thick as the panel portion 29, the cowl top cover 1 of the first embodiment can suppress a primary shrinkage which may be caused to the back end portion 27 in the forming.

Namely, the panel portion 29 (extending in the vehicular widthwise direction and covering the surface of the front windshield panel 7) and the thin plate portion 47 (for connecting the clip portions 33 with each other) can make the cowl top cover 1 which is a long piece product continuous in the vehicular widthwise direction and can maintain rigidity of product. In addition, the clip portions 33 are connected with each other by means of the thin plate portion 47 which is thinner than the panel portion 29. As such, the following deformations can be suppressed: a) deformation of the back end portion 27 (of the cowl top cover 1 formed by synthetic resin) mounted to the front windshield panel 7, which deformation is a primary shrinkage in the forming; and b) deformation caused by a load (own weight) applied to the cowl top cover 1 in such occasions as i) volume shrinkage or expansion in temperature change, storage as a single product, and transportation as a single product.

As such, according to the first embodiment, the deformation of the back end portion 27 of the cowl top cover 1 is suppressed. Thereby, a gap which may be formed between the cowl top cover 1 and the front windshield panel 7, thus preventing deterioration of the vehicle quality. Moreover, an excessive load can be prevented from being applied to the front windshield panel 7.

Moreover, according to the first embodiment, as shown in FIG. 7, when a load is applied in a direction E for opening the thin plate portion 47 to be spaced apart from the panel portion 29, the thin plate portion 47 can be deformed with ease as denoted by 2-dot chain lines. As such, the rigidity of the thin plate portion 47 is unlikely to cause an effect on the power of the clip portions 33 for partially clamping the front windshield panel 7. Even when the thin plate portion 47 has a function of a gutter as a water receiving portion to be mentioned afterward, the panel portion 29's force mating with the front windshield panel 7 can be prevented from being excessively large, thus suppressing the load applied to the front windshield panel 7.

Figure 8A:
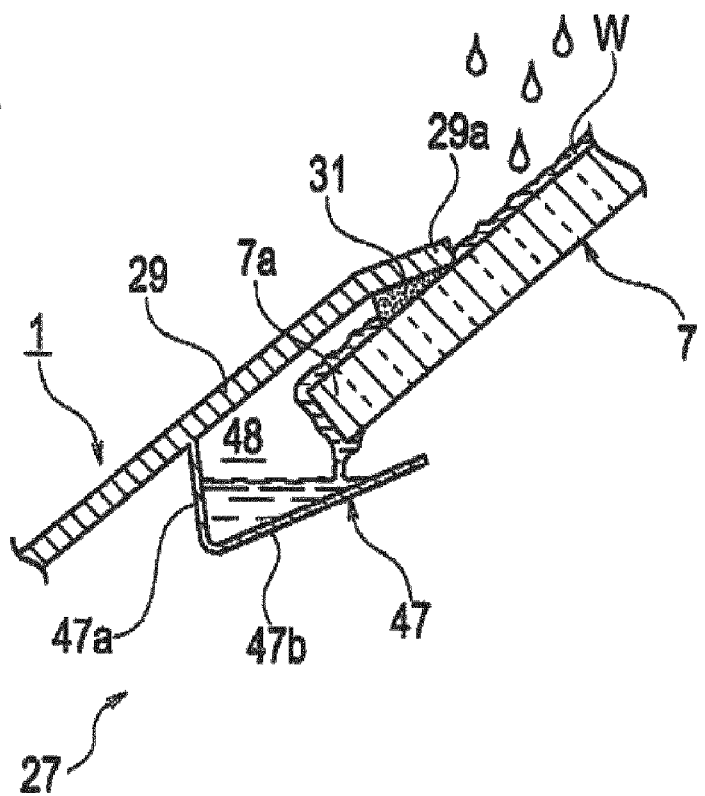
FIG. 8A explains a state that a water such as rain water flows a front windshield panel and is received by the thin plate portion of the cowl top cover, and FIG. 8B explains a state that the water received by the thin plate portion is drained from a thorough hole of a clip portion.

Then, the thin plate portion 47's function as a gutter is to be set forth. As shown in FIG. 8A, a water W such as rain water flows down along the front windshield panel 7 and moves from outside through the gap between the front windshield panel 7 and the cowl top cover 1's panel portion 29 and then enters the back end portion 27. In this case, the thin plate portion 47 having the front wall 47a and the base wall 47b receives, like a gutter, the water W in the upper space 48. That is, the thin plate portion 47 is provided with a water receiving portion for receiving the water W entering from outside.

Figure 8B:
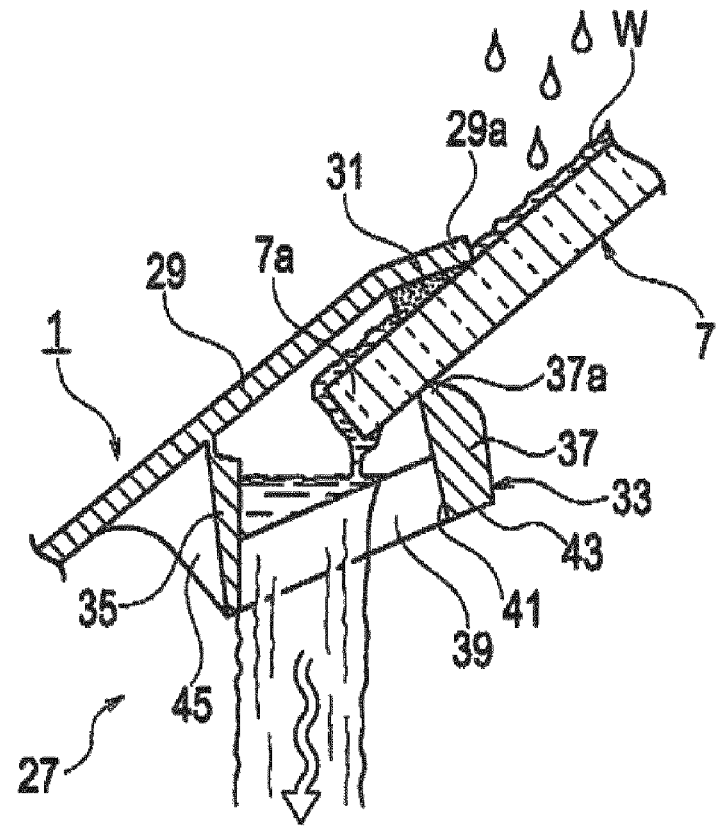

Then, the water W received by the thin plate portion 47 is, as shown in FIG. 8B, drops downward from the clip portion 33's through hole 41 which is continuous with the upper space 48, and then the water W is drained into an air box space 49 formed between the cowl top panel 9 and the cowl top cover 1, as shown in FIG. 1. In this case, the base face 43 which is a lower end face of the clip portion 33 protrudes more downward than the base wail 47b as a lower end face of the thin plate portion 47 (see FIG. 5). As such, the water W drained into the space 49 can assuredly drop from the through hole 41 directly downward, without being dispersed around.

That is, in the cowl top cover 1, the position for setting the clip portion 33 can serve, as it is, as a draining position. In the vehicular widthwise direction, the position for setting the clip portion 33 is shifted relative to electric parts which are other parts such as a blower unit (for introducing external air), a wiper driver and the like and are disposed in the air box space 49. This shifting can prevent the electric parts from the water W, thus preventing failure of the electric parts.

As such, according to the first embodiment, a special water receiving portion other than the cowl top cover 1 is not necessary and the thin plate portion 47 integrated with the cowl top cover 1 can keep the electric parts from the water W. With this, compared with an occasion of providing the special water receiving portion otherwise, increase in cost and mass can be more suppressed according to the first embodiment.

Then, various structural examples where the electric parts are to be put directly below the clip portion 33 for convenience sake of parts layout are to be set forth.

First Example

Figure 9:
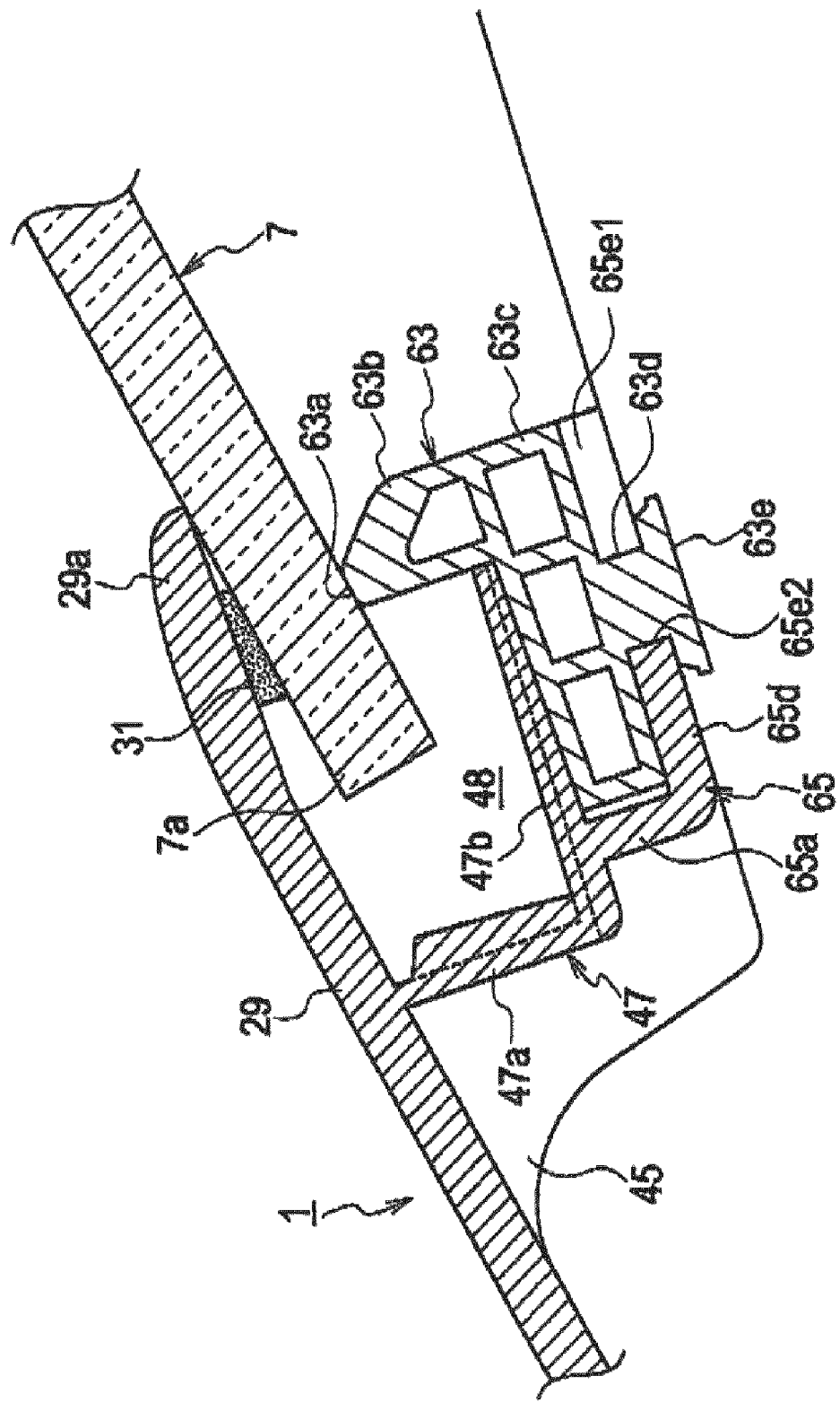
FIG. 9 is a cross sectional view of a structure not showing a water-draining through hole at a clip portion according to a first example, where
Figure 10A:
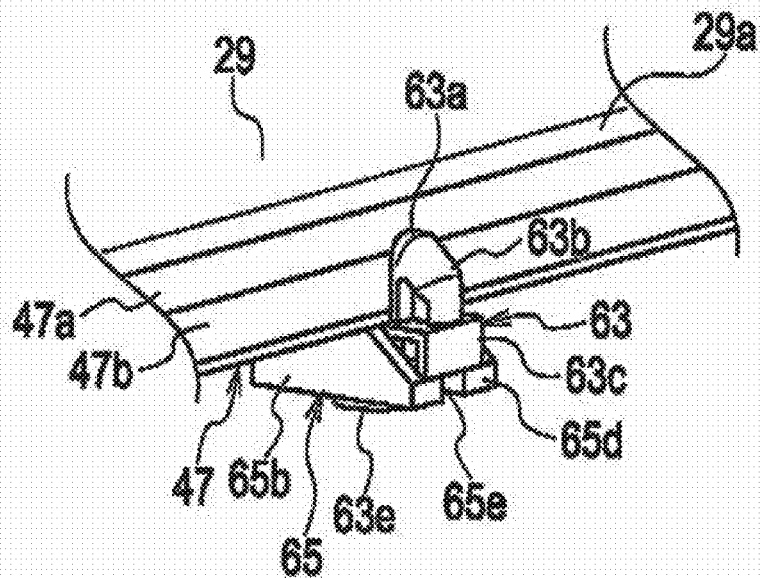
Figure 10B:
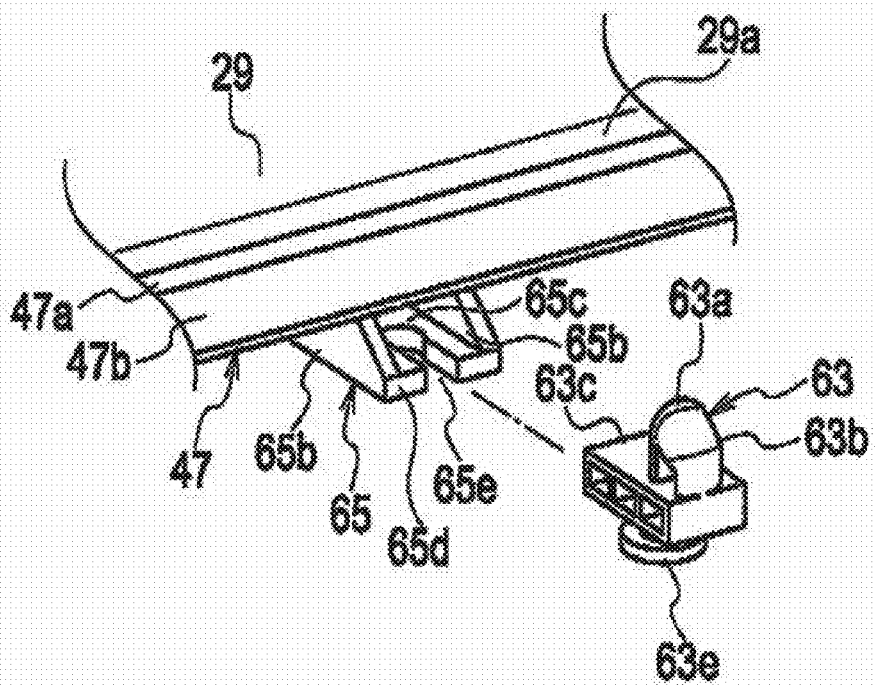
FIG. 10B is an exploded perspective view of FIG. 9, according to the first example.

As a first example, FIG. 9 shows a structure having a part corresponding to the clip portion 33. Herein, FIG. 9 is a cross sectional view as a counterpart of FIG. 4A, FIG. 10A is a perspective view omitting the front windshield panel 7, and FIG. 10B is an exploded perspective view of FIG. 10A.

The through hole 41 as a water draining hole provided for the clip portion 33 in FIG. 4A is not provided in FIG. 9, according to the first example. A clip body 63 which is a member separated from the thin plate portion 47 is mounted to a mounting portion 65 integrated with the thin plate portion 47 and the mounting portion 65 is mounted to the base wall 47b of the thin plate portion 47.

The mounting portion 65 has a box part which is opened on a vehicular backside. The mounting portion 65 has a front wall 65a extending downward substantially in parallel to the front wall 47a from the base wall 47b's portion close to the front wall 47a, a side wall 65b on either side in the vehicular widthwise direction, and a base wall 65d which is formed in parallel to the base wall 47b and defines a box space 65c between the base wall 47b and each of the right and left side walls 65b.

Figure 11:
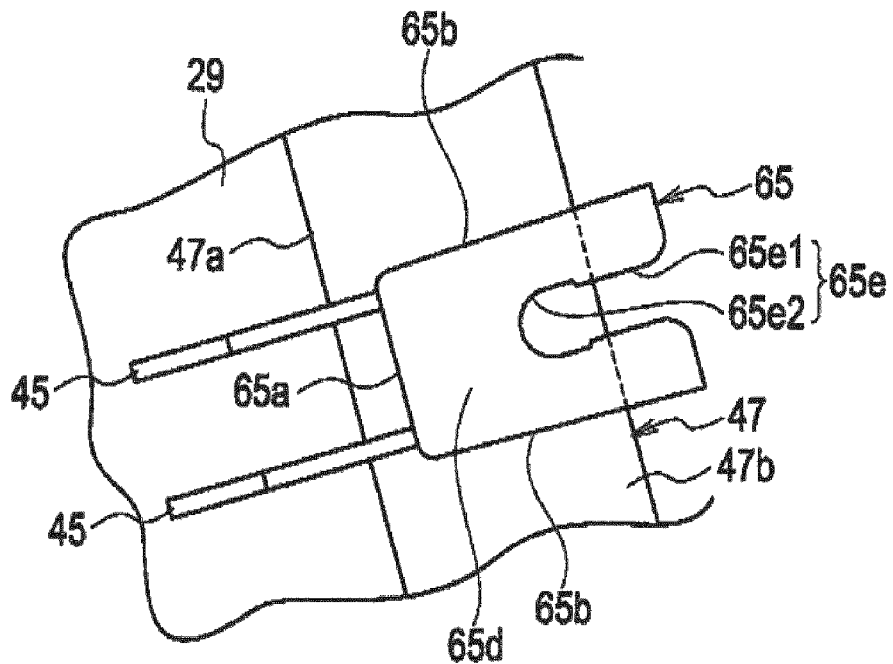
FIG. 11 is a bottom view of FIG. 12.

Moreover, the base wall 65d is formed with a cutout hole 65e which is cut out from an opening side of the vehicular backward part. The cutout hole 65e is, as shown in the bottom view in FIG. 11, provided with a guide portion 65e1 on the opening side and a fixed portion 65e2 which is disposed at an inner end of the guide portion 65e1 and is formed into a semicircle having an inner diameter larger than the width dimension of the guide portion 65e1.

On the other hand, the clip body 63 includes a protruding portion 63b provided with a contact portion 63a which is a counterpart of the contact portion 37a of the clip portion 33 in FIG. 4A, an inserting portion 63c adapted to enter the box space 65c of the mounting portion 65, a shaft portion 63d adapted to enter the fixed portion 65e2 by being guided by the guide portion 65e1 of the cutout hole 65e, and a circular flange portion 63e formed at the tip end of the shaft portion 63d.

As such, sliding the shaft portion 63d of the clip body 63 along the guide portion 65e1 and pushing the shaft portion 63d into the fixed portion 65e2 allow the shaft portion 63d to enter the fixed portion 65e2. Simultaneously with these operations, the inserting portion 63c is accommodated in the box space 65c. In this state, as shown in FIG. 9A, the contact portion 63a of the protruding portion 63b is caused to contact the backface (lower end portion 7a) of the front windshield panel 7. In this case, the clip body 63 has such a state that the contact portion 63a contacting the lower end portion 7a of the front windshield panel 7 protrudes toward the upper space 48 in the water receiving portion.

As such, the clip body 63 which is a member separated from the thin plate portion 47 is mounted to the mounting portion 65 integrated with the base wall 47b of the thin plate portion 47. With this, even when the electric parts are to be put directly below the clip portion for convenience sake of the parts layout, the electric parts can be kept from the water W, thus preventing a possible failure of the electric parts.

Figure 12:
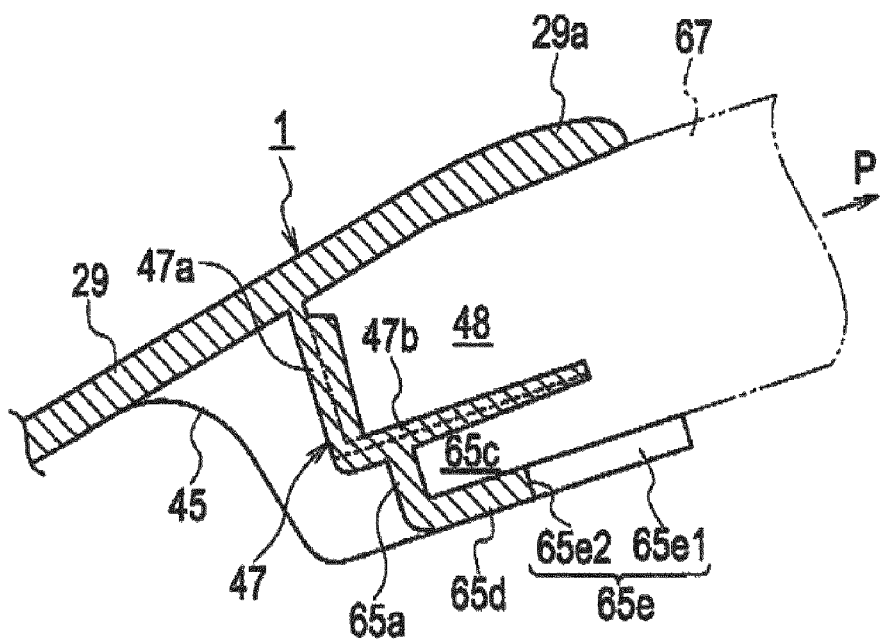
FIG. 12 is a cross sectional view of a molding tool for the cowl top cover, showing a slide core for forming a box space.

Moreover, the cowl top cover 1 having the structure in FIG. 9 has the clip body 63 provided with the contact portion 63a protruding toward the upper space 48 side is a member separated from the thin plate portion 47. As such, when the cowl top cover 1 is subjected to the resin forming, sliding a slide core 67 (for forming the upper space 48) in the direction P can simultaneously form the box space 65c for mounting the clip body 63, as shown in FIG. 12. In the forming of the box space 65c, there is no need of providing a through hole (like through hole 41) serving as a water draining hole.

In the aforementioned FIG. 4A, the contact portion 37a of the clip portion 33 integrated with the thin plate portion 47 protrudes toward the upper space 48 side. As such, it is necessary to slide and downwardly pull a slide core for forming a space on the upper space 48 side, thus forming the through hole 41 as a water draining hole.

Second Example

FIG. 13 shows a second example replacing the first example in FIG. 9. Herein, a clip body 69 is so integrated with the thin plate portion 47 as to rotate via a hinge portion 71 as a thinned rotation connecting portion which is a part of the clip body 69. Herein, in the molding of the cowl top cover 1, the clip body 69 in FIG. 13A is disposed in a position denoted by 2-dot chain line. After the molding of the cowl top cover 1, the clip body 69 is rotated in the direction Q around the hinge portion 71, to be set in a position denoted by the actual line in FIG. 13A, which shows a use state.

FIG. 13B and FIG. 13C each show a molding state. FIG. 13C is a view taken in the direction XIIIC in FIG. 13B. A thick portion 73 is formed at the base wall 47b of the thin plate portion 47. A protruding portion 75 disposed opposite to the front wall 47a and protruding downward is formed in the thick portion 73's position corresponding to the front wall 47a. The hinge portion 71 is disposed at the tip end of the protruding portion 75. Moreover, as shown in FIG. 13C, a side wall portion 77 having an end portion which is disposed in a position substantially same as a position of the protruding portion 75 is formed on either side of the thick portion 73.

The hinge portion 71 of the clip body 69 is provided with a base plate portion 69a extending, in the molding, continuously with the binge portion 71 in the direction same as the protruding direction of the protruding portion 75. A protruding portion 69c having a contact portion 69b adapted to contact the backface of the front windshield panel 7 is provided at the tip end of the base plate portion 69a. Moreover, on the thin plate portion 47 side at the upper part of the protruding portion 690 in FIG. 13B, there is provided an engageable nail portion 69d as a reactive force receiving portion which is engageable with the back end 47b1 of the base wall 47b.

In the forming of the cowl top cover 1 having the configuration shown in FIG. 13B, the following operations are taken: In the direction P, sliding a slide core 79 for forming the upper space 48, like the slide core 67 in FIG. 12. In the direction R, sliding a lower slide core 81 for forming the engageable nail portion 69d. As such, without the need of providing a through hole as a water draining hole, the clip body 69 can be formed simultaneously with the forming of the cowl top cover 1.

The thus formed body 69 is, as shown in FIG. 13A, rotated by 90° around the hinge portion 71 in the direction Q from the forming position denoted by the 2-dot chain line. With this, the engageable nail portion 69d is engaged with the back end 47b1 of the base wall 47b, bringing about the use state denoted by the actual line in FIG. 13A. In this case, the clip body 69 has such a state that the contact portion 69b adapted to contact the lower end portion 7a of the front windshield panel 7 protrudes to the upper space 48 in the water receiving portion.

As such, according to the second example, even when the electric parts are to be put directly below the clip portion for convenience sake of the parts layout, the electric parts can be kept from the water W, thus preventing a possible failure of the electric parts. This is an effect accomplished like the first example. In this case, according to the second example, it is not necessary to form the clip body 69 as a separated member, unlike the clip body 63 which is a separated member according to the first example. Therefore, according to the second example, the production cost can be suppressed low and parts control is made easy. In addition, according to the second example, a simple operation of rotating the clip body 69 after the forming is excellent in assemblability.

Third Example

Second Example Modified

Figure 14A:
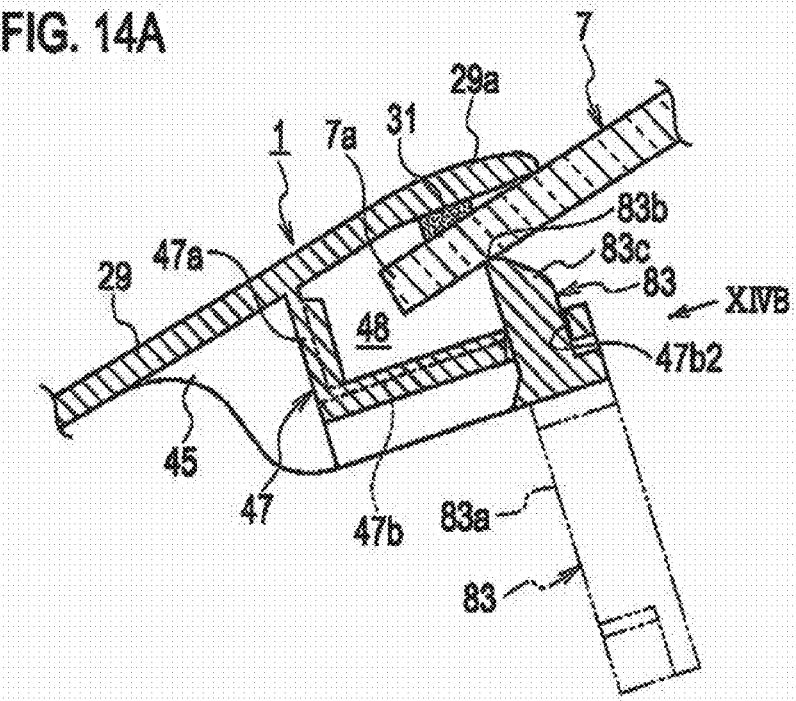
FIG. 14A is a cross sectional view according to a third example, where
Figure 14B:
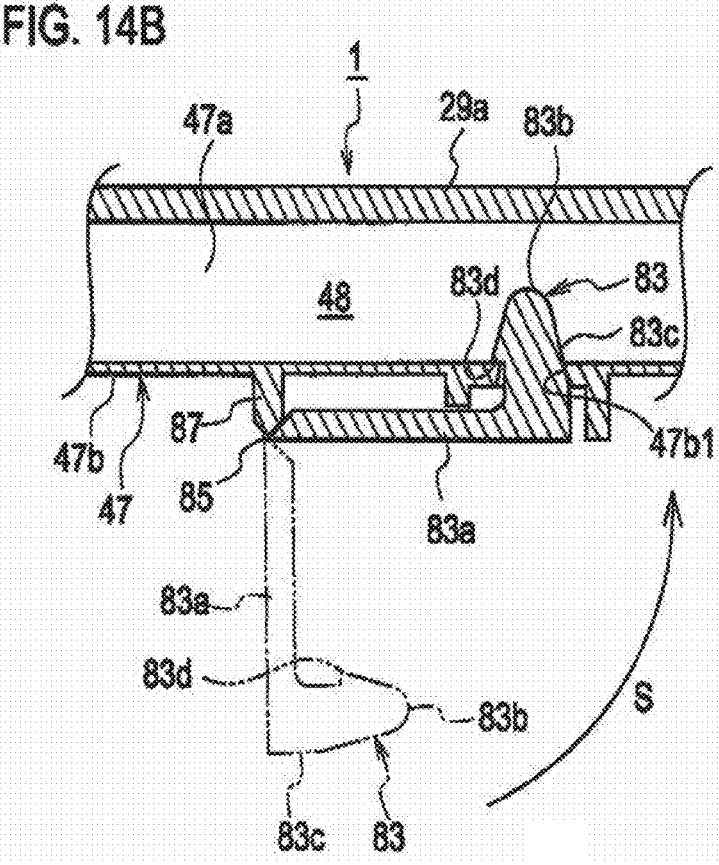
FIG. 14B is a view taken in the direction XIVB in FIG. 14A.

FIG. 14A and FIG. 14B each show a third example which is a modified example of the second example. FIG. 14B is a view taken in the direction XIVB in FIG. 14A. Specifically, in the forming of the cowl top cover 1, a clip body 83 is disposed in a position denoted by the 2-dot chain line. After the forming of the cowl top cover 1, sliding the clip body 83 in the direction S around a hinge portion 85 brings about a use state.

Figure 15A:
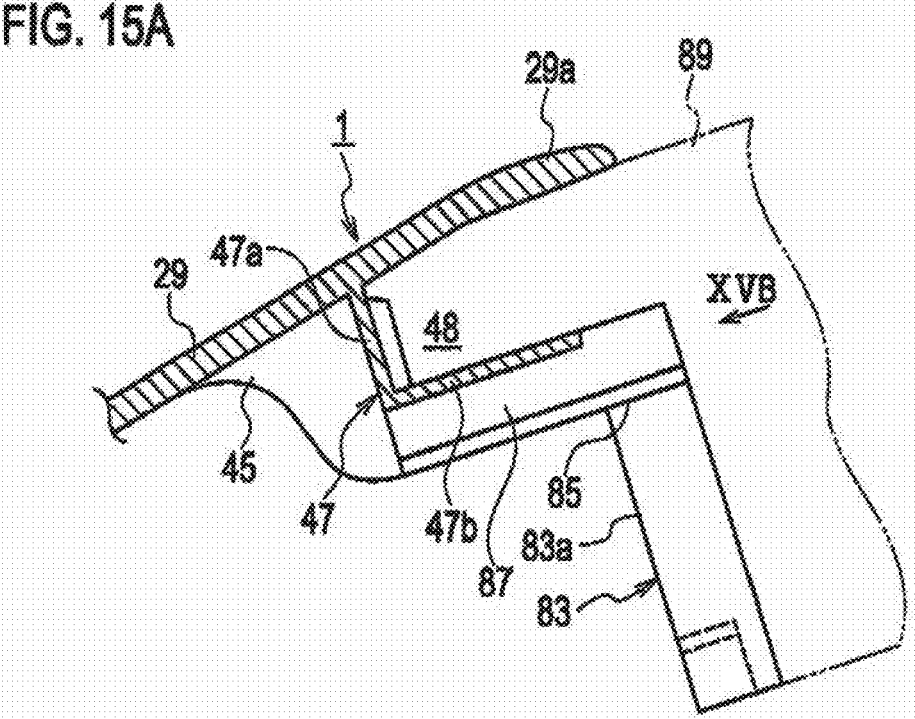
FIG. 15A is a cross sectional view showing a state after the molding according to the third example.
Figure 15B:
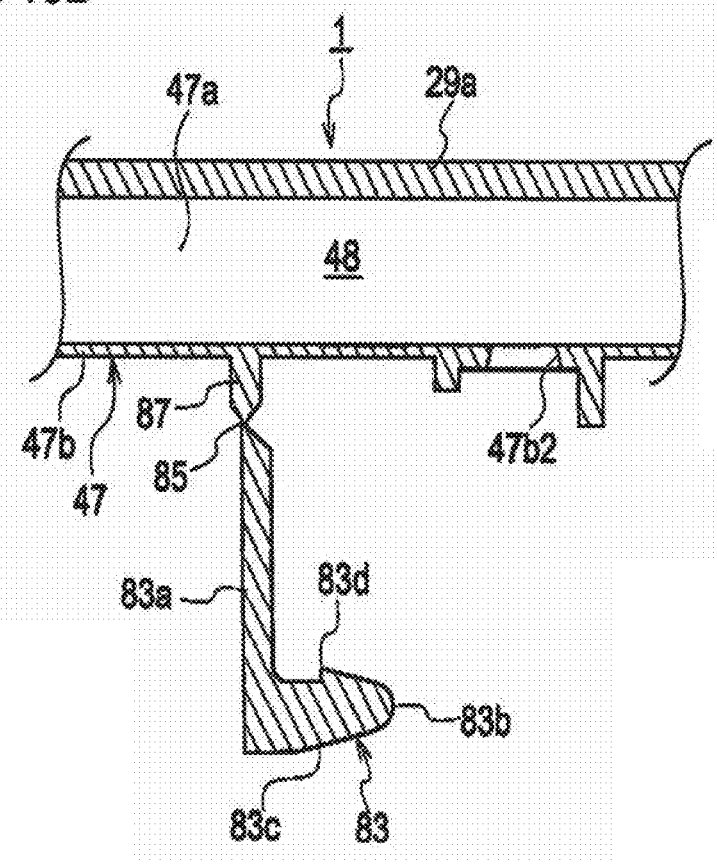
FIG. 15B is a view taken in the direction XVB in FIG. 15A.

FIG. 15A and FIG. 15B each show a forming state that a downward protrusion 87 is formed at the base wall 47b of the thin plate portion 47 and the hinge portion 85 is provided at the tip end of the protrusion 87. FIG. 15B is a view taken in the direction XVB in FIG. 15A.

In the molding as shown in FIG. 15A and FIG. 15B, the clip body 83 has such a configuration that a base plate portion 83a extending continuously with the protrusion 87 in the direction same as the protruding direction of the protrusion 87 is disposed at the hinge portion 85. A protruding portion 83c having a contact portion 83b adapted to contact the backface of the front windshield panel 7 is disposed at the tip end of the base plate portion 83a.

On the other hand, a mating hole 47b2 into which the protruding portion 83c is inserted is disposed at the base wall 47b of the thin plate portion 47. An engageable nail portion 83d as a reactive force receiving portion which is engageable with a peripheral edge of the mating hole 47b2 with the protruding portion 83c inserted into the mating hole 47b2 is disposed on the thin plate portion 47 side (upper part in FIG. 15A and FIG. 15B) of the protruding portion 83c.

In the forming of the cowl top cover 1 having the configuration shown in FIG. 15A and FIG. 153, a slide core 89 for forming the upper space 48 is slidably moved in the direction P, like the slide core 67 in FIG. 12. As such, without the need of providing a through hole as a water draining hole, the clip body 83 can be formed simultaneously with the forming of the cowl top cover 1.

The thus formed body 83 is, as shown in FIG. 14B, rotated by 90° around the hinge portion 85 in the direction S from the forming position denoted by the 2-dot chain line. With this, the engageable nail portion 83d is engaged with the peripheral edge of the mating hole 47b2, bringing about the use state denoted by the actual line in FIG. 14A and FIG. 14B. In this case, the clip body 83 has such a state that the contact portion 83b adapted to contact the lower end portion 7a of the front windshield panel 7 protrudes to the upper space 48 in the water receiving portion.

As such, according to the third example, even when the electric parts are to be put directly below the clip portion for convenience sake of the parts layout, the electric parts can be kept from the water W, thus preventing a possible failure of the electric parts. This is an effect accomplished like the second example. In this case, according to the third example, it is not necessary to form the clip body 83 as a separated member, unlike the clip body 63 which is a separated member according to the first example. Therefore, according to the third example, the production cost can be suppressed low and parts control is made easy. In addition, according to the third example, a simple operation of rotating the clip body 83 after the forming is excellent in assemblability.

Fourth Example

Second Example Modified Otherwise

Figure 16A:
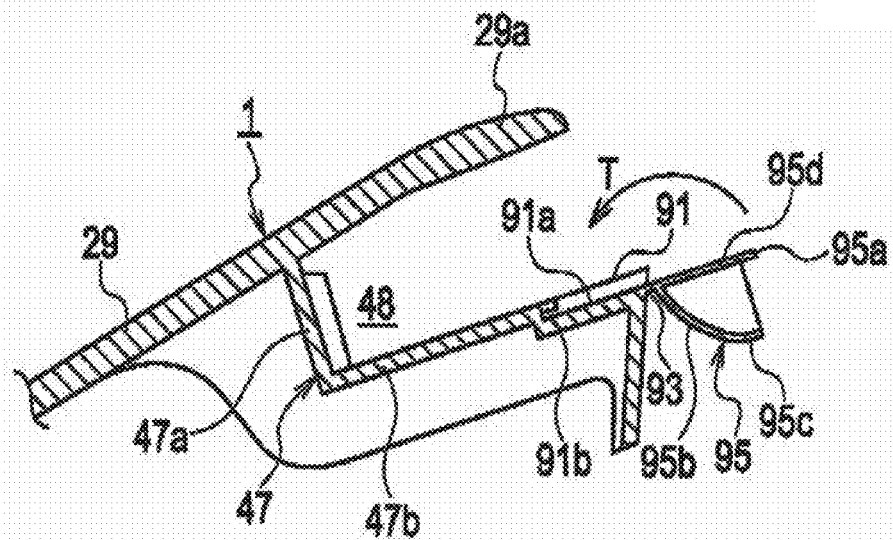
FIG. 16A is a cross sectional view according to a fourth example, where
Figure 16B:
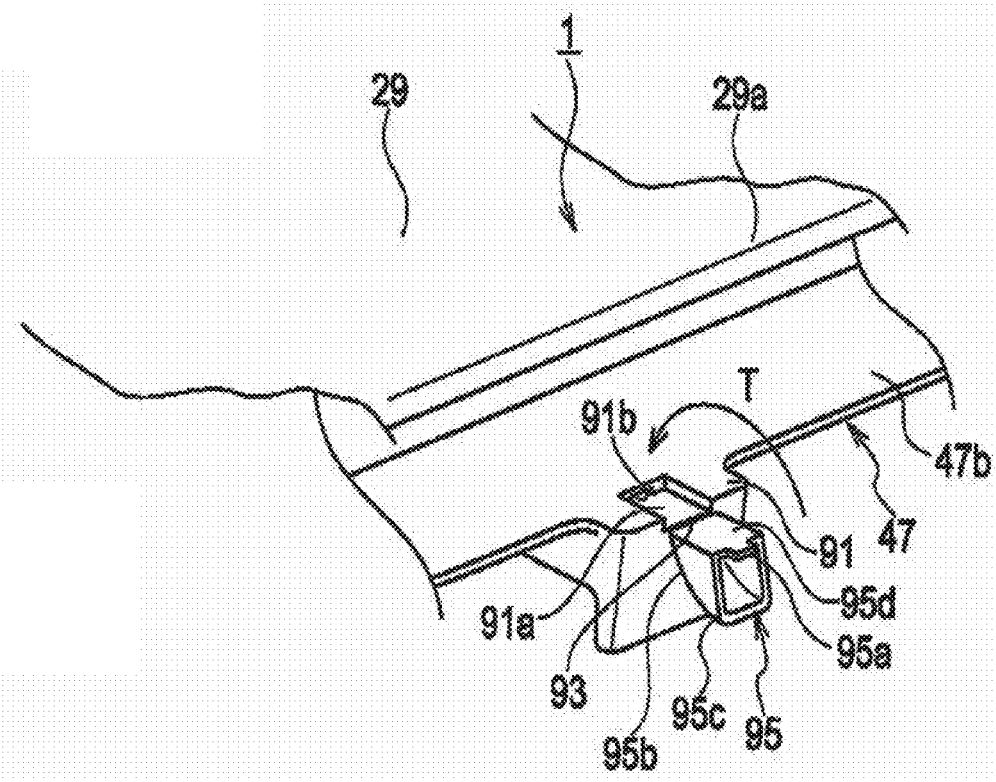
FIG. 16B shows a perspective view according to the fourth example.

FIG. 16A, FIG. 16B, FIG. 17A and FIG. 17B each show a fourth example which is an otherwise modified example of the second example. Specifically, FIG. 16A and FIG. 16B each show a state of the cowl top cover 1 in the molding while FIG. 17A and FIG. 17B each show a state of the cowl top cover 1 after the molding. According to the fourth example, a bulging portion 91 bulging further forward (vehicular backward) from the base wall 47b is formed at the tip edge of the base wall 47b of the thin plate portion 47. A clip body 95 is integrated with the bulging portion 91 via a hinge portion 93 as a rotation connecting portion, as shown in FIG. 16A and FIG. 16B.

Figure 17A:
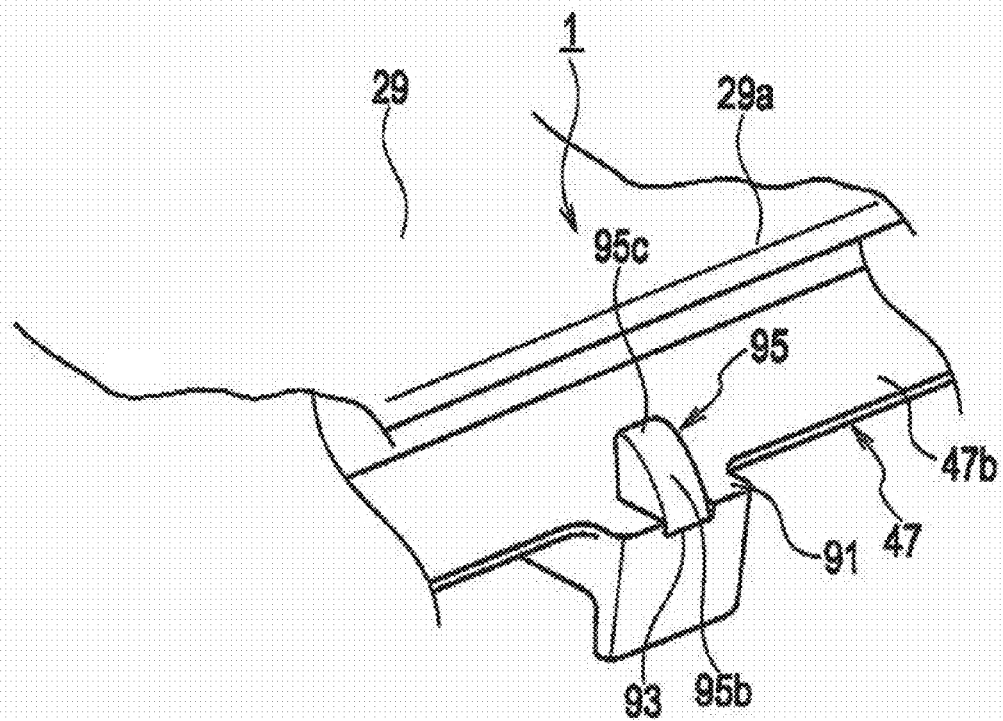
FIG. 17A is a perspective view of the cowl top cover after assembly, according to the fourth example.
Figure 17B:
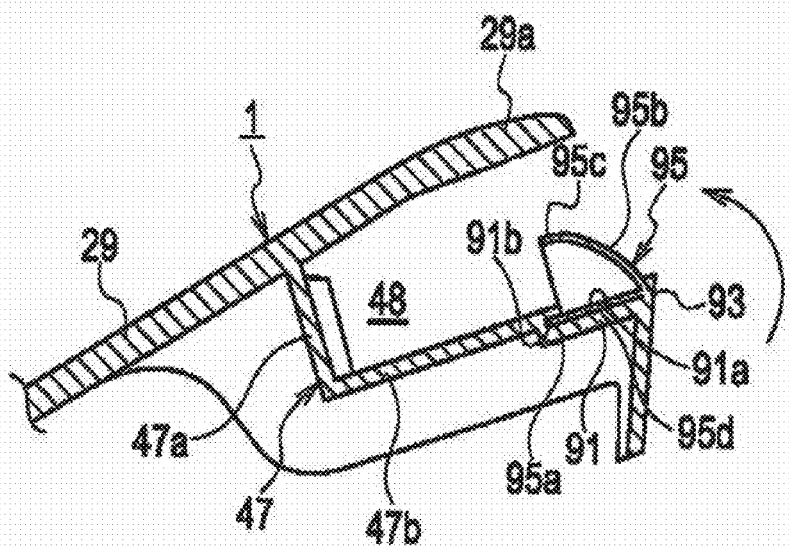
FIG. 17B is a cross sectional view of the same.
Figure 18A:
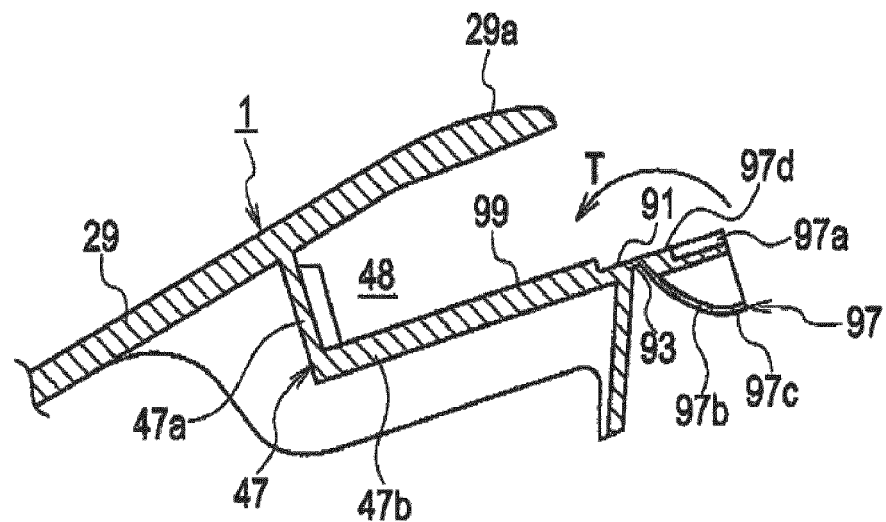
FIG. 18A is a cross sectional view according to a fifth example, where
Figure 18B:
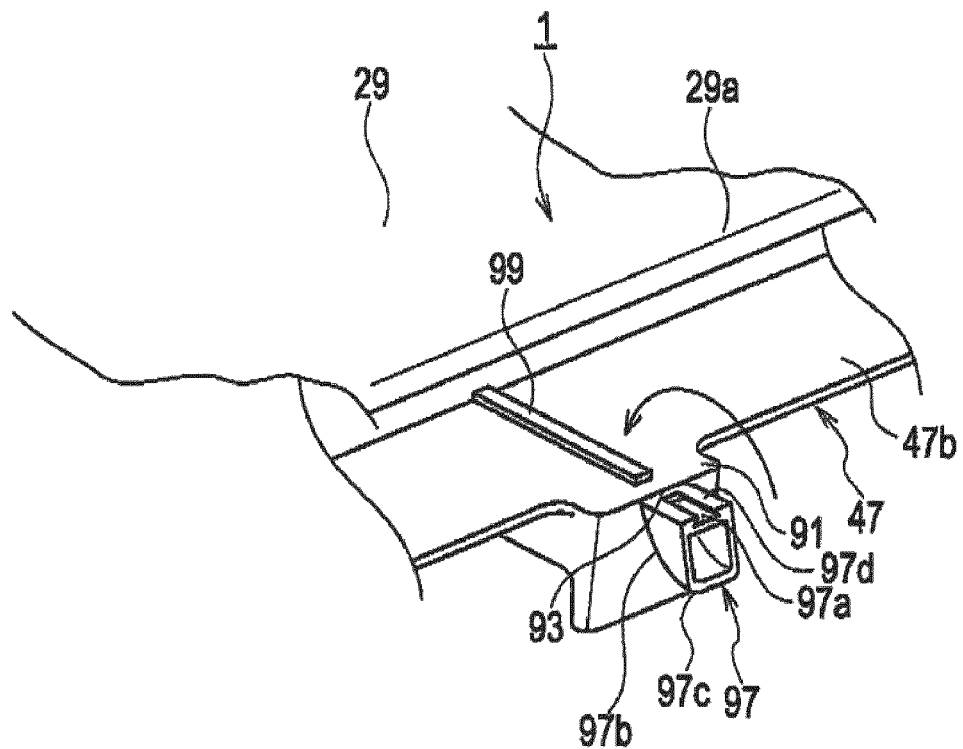
FIG. 18B shows a perspective view according to the fifth example.

After the forming, rotating the clip body 95 in the direction T around the hinge portion 93 in FIG. 16A and FIG. 16B brings about the use state shown in FIG. 17A and FIG. 17B. In this case, a part of the clip body 95 enters a concave portion 91a formed in the upper face of the bulging portion 91, and an engageable nail portion 95a of the clip body 95 is engaged with an engageable hole 91b formed in the concave portion 91a, thus bringing about the use state in FIG. 17A and FIG. 17B.

With the clip body 95 in the use state in FIG. 17A and FIG. 17B, an outer peripheral face opposite to the engageable nail portion 95a is shaped into an arc (arc portion 95b), as shown in FIG. 17B. A contact portion 95c adapted to contact the lower end portion 7a of the front windshield panel 7 is disposed in the vicinity of an upper end of the arc portion 95b. The contact portion 95c protrudes to the upper space 48 in the water receiving portion. Moreover, with the clip body 95 in the use state in each of FIG. 17A and FIG. 17B, a flat portion 95d is continuous with the arc portion 95b's one side edge on the hinge portion 93 side. The flat portion 95d serves as an opposing face (reactive force receiving portion) to oppose a base face of the concave portion 91a.

As such, the fourth example also brings about the same effect as brought about according to the second example and the third example. Moreover, the fourth example can form the clip body 95 that is more compact than the counterparts (clip body 69, clip body 83) according to the second example and the third example respectively, thereby improving the handling capability of the cowl top cover 1 after the molding, leading to an improved assemblability.

Fifth Example

Second Example Modified Still Otherwise

Figure 19A:
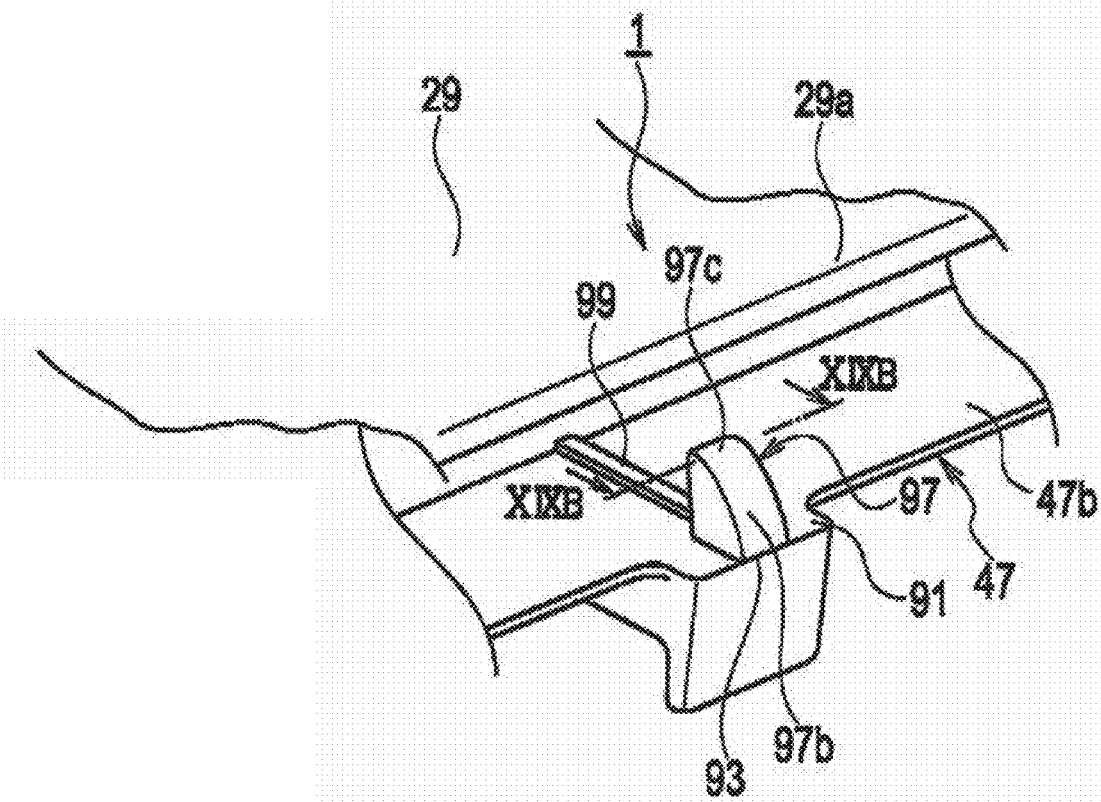
FIG. 19A is a perspective view of the cowl top cover after assembly, according to the fifth example.
Figure 19B:
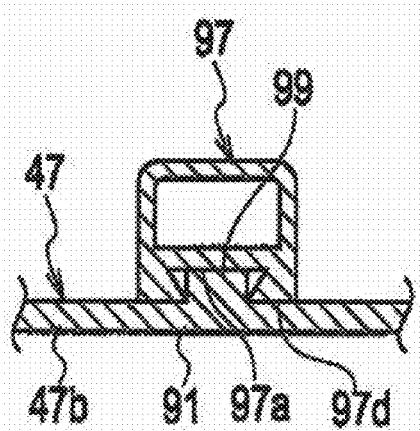
FIG. 19B is a cross sectional view taken along the line XIXB-XIXB in FIG. 19A.

FIG. 18A, FIG. 18B, FIG. 19A and FIG. 19B each show a fifth example which is a still otherwise modified example of the second example. FIG. 19B is a cross sectional view taken along the line XIXB-XIXB in FIG. 19A. Specifically, FIG. 18A and FIG. 18B each show a state of the cowl top cover 1 in the molding while FIG. 19A and FIG. 19B each show a state of the cowl top cover 1 after the molding. According to the fifth example, the entire configuration of a clip body 97 is substantially equivalent to that of the clip body 95 shown in FIG. 16A, FIG. 16B, FIG. 17A and FIG. 17B according to the fourth example.

The fifth example's difference from the fourth example is that the clip body 97 is provided with an ant groove 97a as an engageable convex portion, where the ant groove 97a is a counterpart of the engageable nail portion 95a of the fourth example. The ant groove 97a extends in the vehicular forward and backward directions. Corresponding to the ant groove 97a, an engageable convex portion 99 is formed on the base wall 47b (of the thin plate portion 47) and on the bulging portion 91.

Then, like the clip body 95 in FIG. 17A and FIG. 17B according to the fourth example, the clip body 97 in the use state in FIG. 19A and FIG. 19B according to the fifth example has such a structure that an outer peripheral face opposite to the ant groove 97a is shaped into an arc (arc portion 97b). A contact portion 97c adapted to contact the lower end portion 7a of the front windshield panel 7 is disposed in the vicinity of an upper end of the arc portion 97b. The contact portion 97c protrudes to the upper space 48 in the water receiving portion.

Moreover, with the clip body 97 in the use state in each of FIG. 19A and FIG. 19B, a flat portion 97d is continuous with the arc portion 97b's one side edge on the hinge portion 93 side. The flat portion 97d serves as an opposing face (reactive force receiving portion) to oppose the bulging portion 91's upper face and the thin plate portion 47b's upper face.

As such, the fifth example also brings about the same effect as brought about according to the second example and the third example. Moreover, the fifth example can form the clip body 97 that is more compact than the counterparts (clip body 69, clip body 83) according to the second example and the third example respectively, thereby improving the handling capability of the cowl top cover 1 alter the molding, leading to an improved assemblability.

Sixth Example

Second Example Modified Still Further Otherwise

FIG. 20A, FIG. 20B, FIG. 21A and FIG. 21B each show a sixth example which is a still further otherwise modified example of the second example. Specifically, FIG. 20A and FIG. 20B each show a state of the cowl top cover 1 in the molding while FIG. 21A and FIG. 21B each show a state of the cowl top cover 1 after the molding. According to the sixth example, the entire configuration of a clip body 101 is substantially equivalent to that of the clip body 95 shown in FIG. 16A, FIG. 16B, FIG. 17A and FIG. 17B according to the fourth example.

Figure 20A:
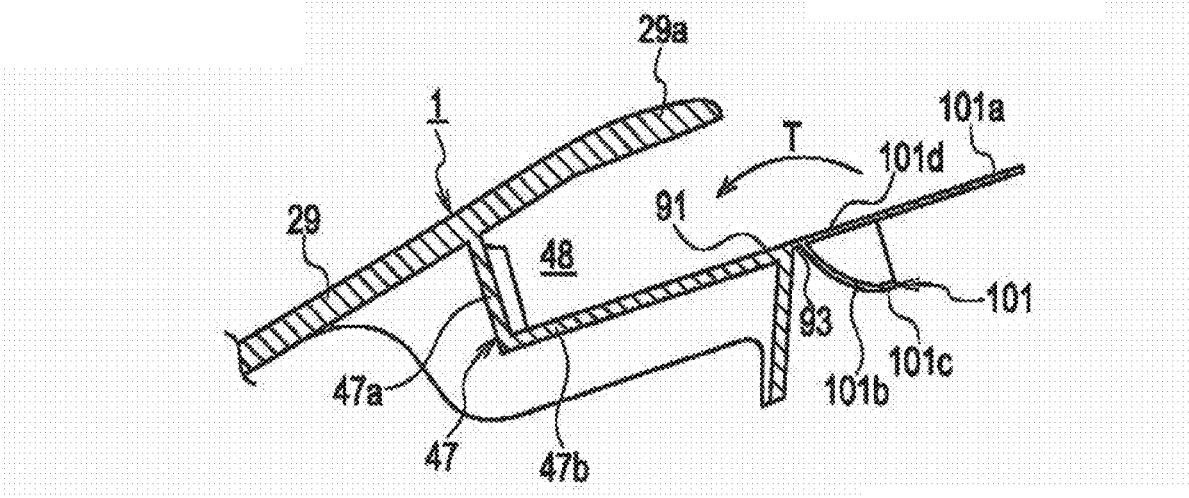
FIG. 20A is a cross sectional view according to a sixth example, where
Figure 20B:
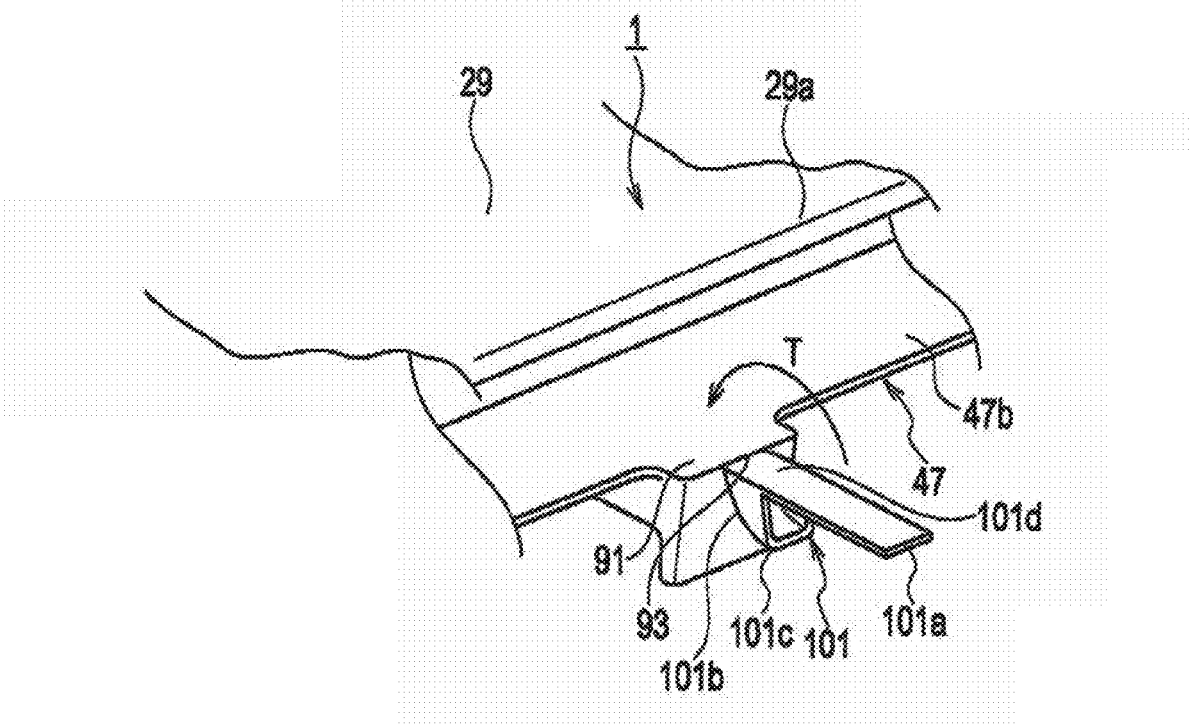
FIG. 20B shows a perspective view according to the sixth example.

The sixth example's difference from the fourth example is that the clip body 101 is provided with a temporary holding arm 101a which serves as a temporary holding member in a form of a tongue piece, where the temporary holding arm 101a is a counterpart of the engageable nail portion 95a of the fourth example. In FIG. 20A and FIG. 20B showing the molding of the cowl top cover 1, the temporary holding arm 101a extends forward (vehicular backward) on the same level with the base wall 47b of the thin plate portion 47.

Figure 21A:
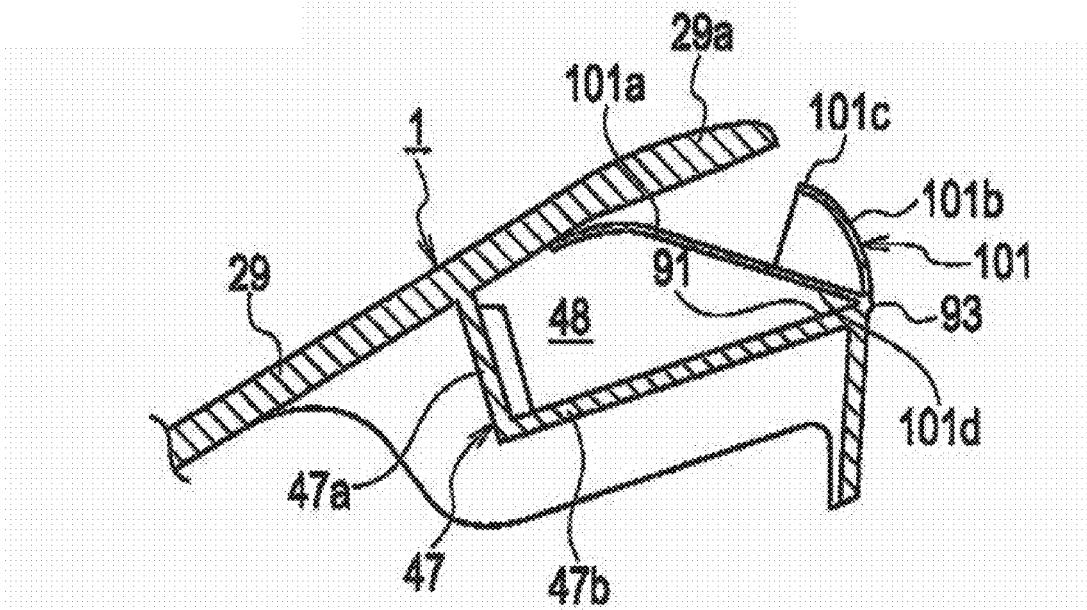
FIG. 21A is a perspective view of the cowl top cover during assembling process according to the sixth example.

After the molding of the cowl top cover 1, the clip body 101 is rotated in the direction T around the hinge portion 93 as shown in FIG. 20A and FIG. 20B, thus bringing about a use state in FIG. 21A. Being pressed to the backface of the panel portion 29 of the cowl top cover 1, the temporary holding arm 101a is elastically deformed. Meanwhile, the temporary holding arm 101a abuts on the panel portion 29's backface in the vicinity of the front wall 47a of the thin plate portion 47, thus bringing about a temporary holding state.

Figure 21B:
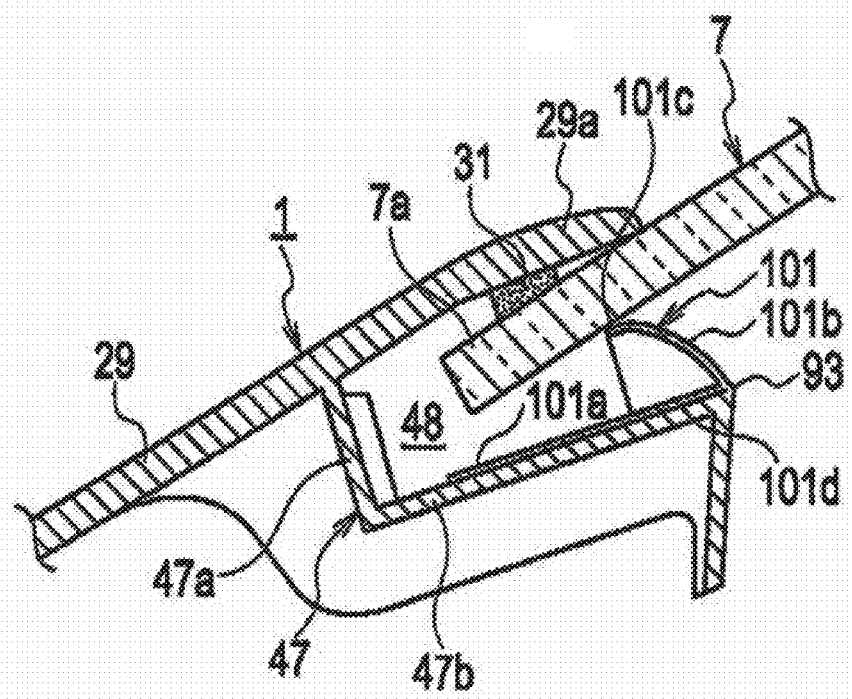
FIG. 21B is a cross sectional view of the cowl top cover set to the vehicle after the assembling process.

Then, as shown in FIG. 21B, for assembling the front windshield panel 7 to the cowl top cover 1, the lower end portion 7a is inserted into the upper apace 48. As such, the temporary holding arm 101a is pressed, to thereby bring about a use state that the temporary holding arm 101a substantially closely adheres on the base wall 47b. That is, the area close to the upper end of an arc portion 101b of the clip body 101 serves as a contact portion 101c adapted to contact the lower end portion 7a of the front windshield panel 7. The contact portion 101c protrudes to the upper space 48 in the water receiving portion.

Moreover, with the clip body 101 in the use state in FIG. 21B, a fiat portion 101d is continuous with the arc portion 101b's one side edge on the hinge portion 93 side. The flat portion 101d serves as an opposing face (reactive force receiving portion) to oppose the bulging portion 91's upper face or the base wall 47b's upper face.

As such, the sixth example also brings about the same effect as brought about according to the second example and the third example. Moreover, the sixth example can form the clip body 101 that is more compact than the counterparts (clip body 69, clip body 83) according to the second example and the third example respectively, thereby improving the handling capability of the cowl top cover 1 alter the molding, leading to an improved assemblability.

Another Embodiment

Figure 22:
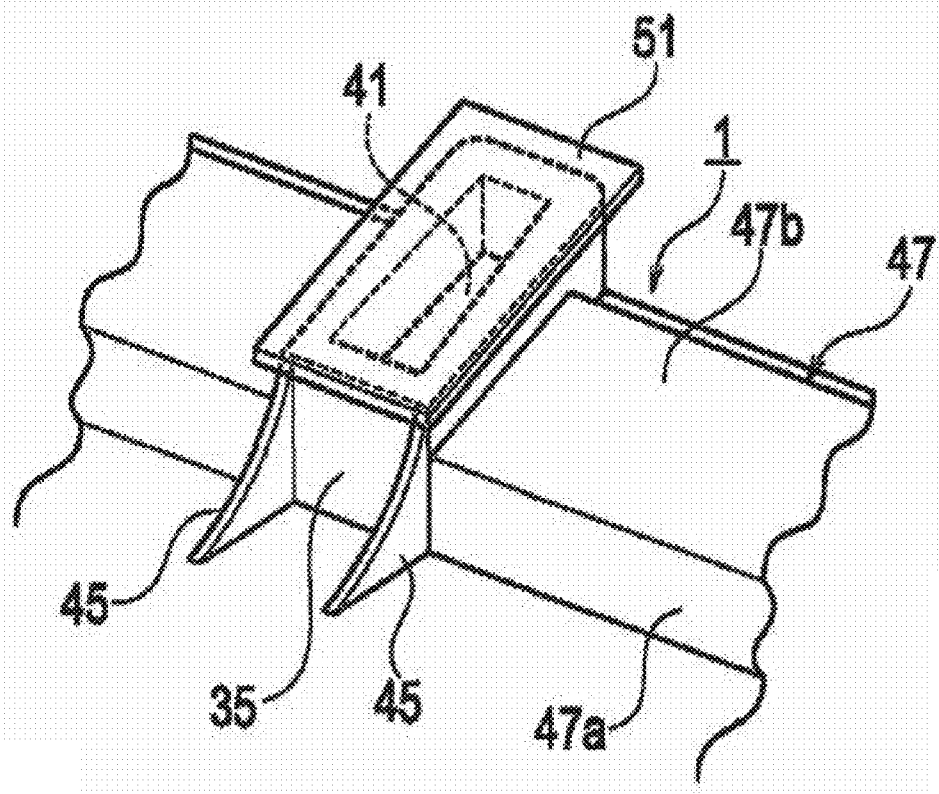
FIG. 22 is a perspective view showing a state where the through hole of the clip portion is sealed with a tape.

FIG. 22 shows another embodiment where the electric parts are to be put directly below the clip portion 33 for convenience sake of the parts layout. According to the another embodiment, a tape 51 and the like is adhered to the base face 43 of the clip portion 33 in FIG. 1, thus sealing the through hole 41. The base face 43 of the clip portion 33, which face is stepless and smooth, has a high adhesion with the tape 51 and the like, thus sealing the through hole 41 with ease and at low cost.

Second Embodiment

Figure 23:
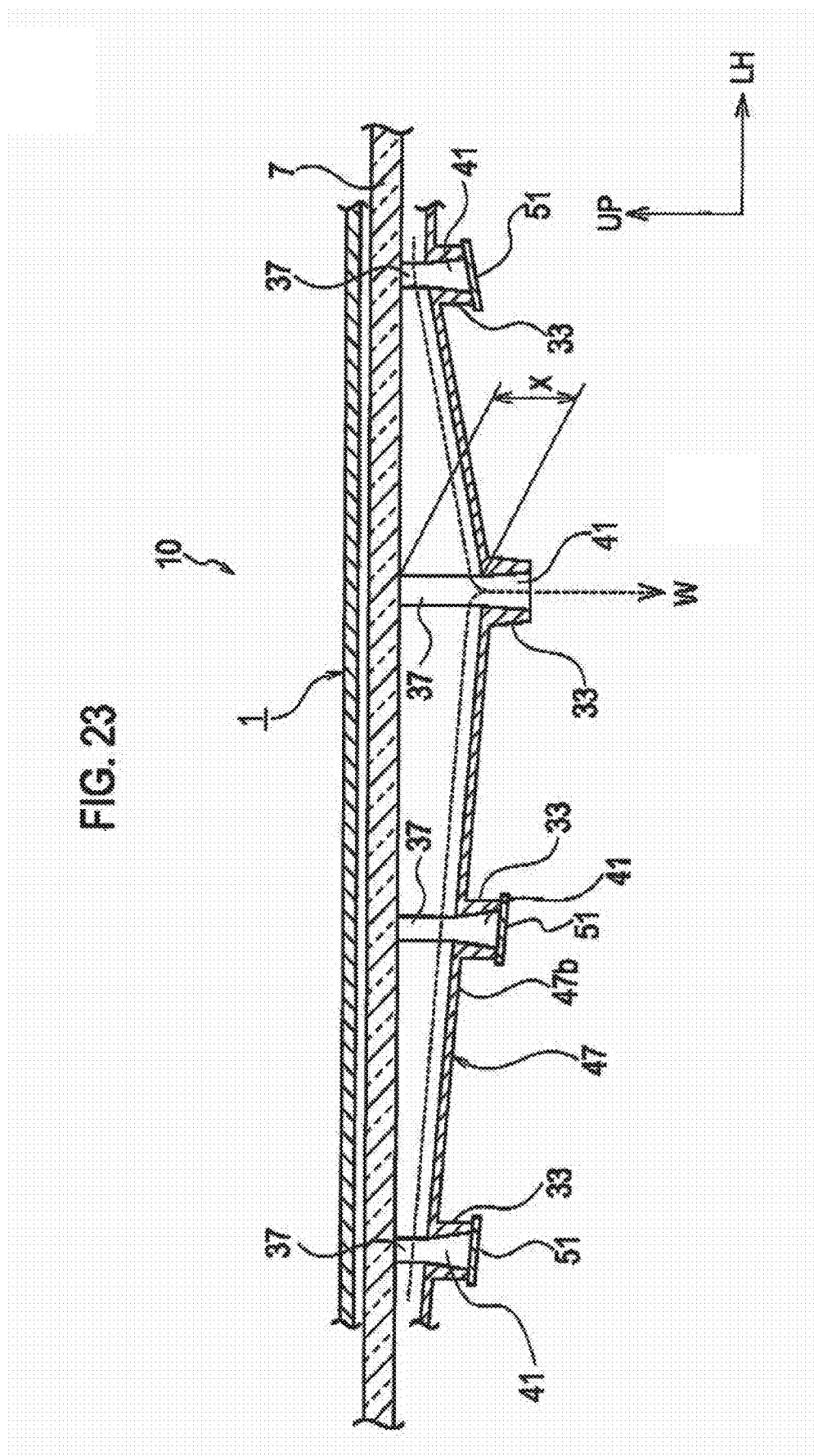
FIG. 23 shows a structure of mounting the cowl top cover, according to a second embodiment of the present invention, where

FIG. 23 shows a structure 10 of mounting the cowl top cover 1, according to a second embodiment of the present invention. FIG. 23 is a cross sectional view which is a counterpart of FIG. 6A. According to the second embodiment, heights of a plurality of the clip portion 33 are varied and the water W is drained from the through hole 41 of the clip portion 33 that is the highest.

That is, according to the second embodiment, of the four clip portions 33 at respective portions of the cowl top cover 1 in FIG. 23, the second clip portion 33 from the right has a dimension X that is the highest while the adjacent clip portions 33 on both sides are gradually lower toward the outside of the vehicular widthwise direction.

According to the above configuration, around the clip portion 33 having the highest dimension X, the base wall 47b of the thin plate portion 47 is so inclined that the thin plate portion 47 is positioned higher toward the outside in the vehicular widthwise direction.

Moreover, the through hole 41 of the clip portion 33 having the highest dimension X is used as a water draining hole while the holes 41 of the other clip portions 33 are each sealed with the tape 51 and the like shown in FIG. 22. As such, the water W drained into the air box space 49 flows the inclined thin plate portion 47 and concentrates to the clip portion 33 having the highest dimension X, to thereby securely drain the water W from the through hole 41 of the clip portion 33 having the highest dimension X.

As such, according to the second embodiment, setting the clip portion 33 (having the highest dimension X) in a position deviated from the electric parts can securely keep the electric parts from the water W.

Third Embodiment

Figure 24:
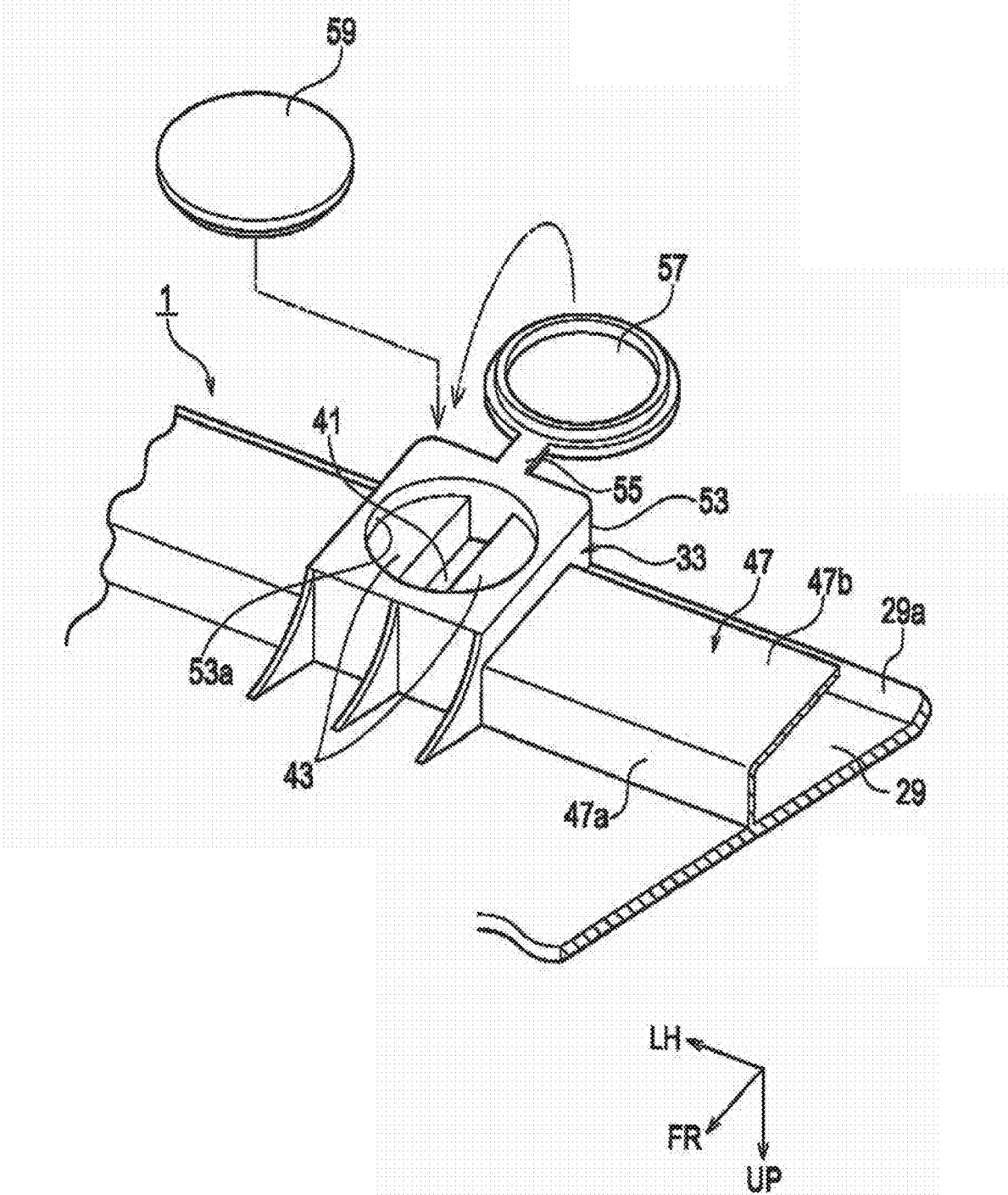
FIG. 24 shows a structure of mounting the cowl top cover, according to a third embodiment of the present invention, where

FIG. 24 shows a structure 10 of mounting the cowl top cover 1, according to a third embodiment of the present invention. FIG. 24 is a perspective view which is a counterpart of FIG. 22 according to the another embodiment According to the third embodiment, a bulging portion 53 is integrated with the clip portion 33 around the lower portion of the clip portion 33, where the bulging portion 53 protrudes more downward than the base face 43 and protrudes on either side in the vehicular widthwise direction. A circular open portion 53a of the bulging portion 53 communicates with the through hole 41 of the clip portion 33.

Moreover, by way of a thin hinge 55, a lid 57 is integrated with an edge portion on the vehicular backward side of the bulging portion 53. With respect to the clip portion 33 having the through hole 41 not used as a water draining hole, the open portion 53a is sealed with the lid 57. Meanwhile, with respect to the clip portion 33 having the through hole 41 used as a water draining hole, the lid 57 is kept open, as shown in FIG. 24.

As such, compared with the another embodiment using the tape 51 in FIG. 22, the third embodiment can facilitate the operation for sealing the through hole 41, thus decreasing the number of component parts (tape 51 not necessary).

Otherwise, a lid 59 which is a separate member may be used in place of the lid 57 integrated with the bulging portion 53, although the use of the lid 59 loses the effect of decreasing the number of component parts.

Fourth Embodiment

Figure 25A:
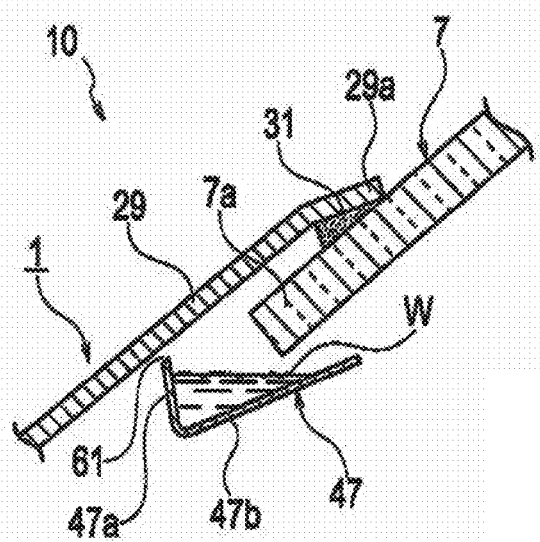
FIG. 25A is a cross sectional view which is a counterpart of FIG. 4B.
Figure 25B:
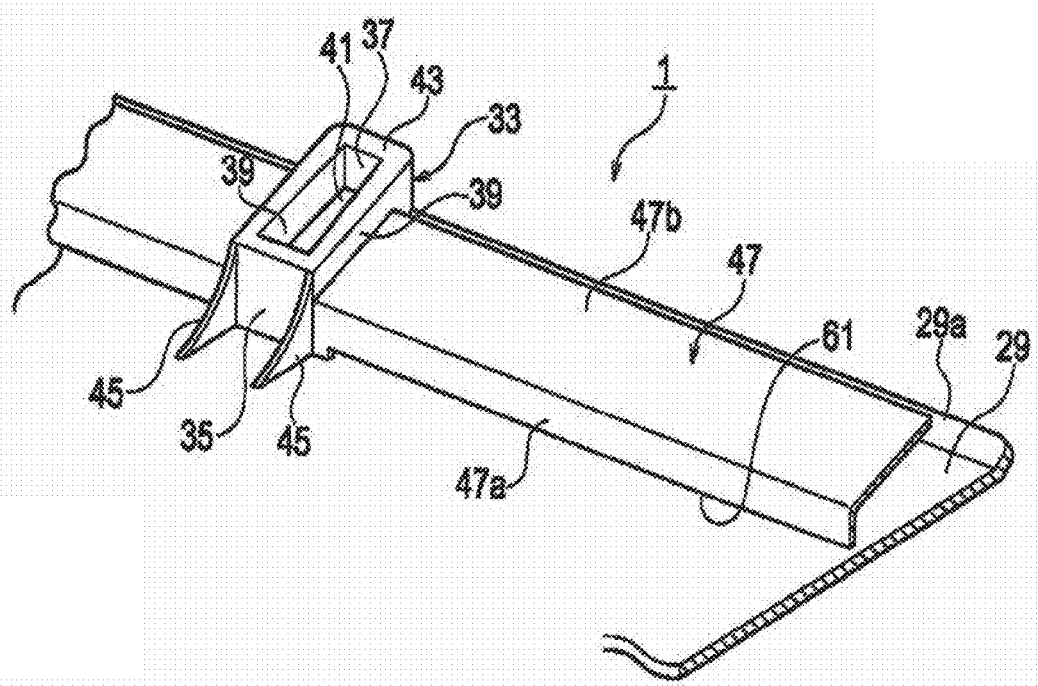
FIG. 25B is a perspective view which is a counterpart of FIG. 5.

FIG. 25A and FIG. 25B each show a structure 10 of mounting the cowl top cover 1, according to a fourth embodiment of the present invention, where FIG. 25A is a cross sectional view which is a counterpart of FIG. 4B, and FIG. 25B is a perspective view (backface) which is a counterpart of FIG. 5. According to the fourth embodiment, a gap 61 is provided between the front wall 47a (of the thin plate portion 47) and the panel portion 29.

Providing the gap 61 decreases rigidity of the entirety of the cowl top cover 1 and decreases a force pressingly applied to the front windshield panel 7 by the clip portion 33, to thereby decrease the load acting on the front windshield panel 7.

In addition, the area for providing the gap 61 along the vehicular widthwise direction is properly varied, to thereby adjust rigidity of the entirety of the cowl top cover 1 and also adjust the force pressingly applied to the front windshield panel 7 by the clip portion 33.

Although the present invention has been described above by reference to certain embodiments and examples, the present invention is not limited to the embodiment and examples described above. Modifications and variations of the embodiment and examples described above will occur to those skilled in the art, in light of the above teachings. Specifically, the panel portion 29 in FIG. 25A and FIG. 25B has a substantially constant plate thickness, but the present invention is, however, not limited to this. The back end 29a bent toward the front windshield panel 7 may have a variable structure.

More specifically, the panel portion 29 may have such structures: A V-shaped notch is provided, for example, for a bent point of the back end 29a. A portion closer to the tip end than the V-shaped notch is thinner than ordinary portions of the panel portion 29 and serves as a lip piece which is somewhat thicker than a remaining thickness of a bottom portion of the V-shaped notch. The portion closer to the tip end serves as a bent portion and is allowed to elastically abut on the front windshield panel 7. Otherwise, with the above V-shaped notch, the back end 29a may have a constant thickness relative to the ordinary portions of the panel portion 29, and is likewise allowed to elastically abut on the front windshield panel 7.

With this, adjusting of a gap between the front windshield panel 7 and the back end 29a is made easy, thus improving an external view of the cowl top cover 1.

This application is based on a prior Japanese Patent Application No. P2009-013412 (filed Jan. 23, 2009 in Japan). The entire contents of the Japanese Patent Application No. P2009-013412 from which priority is claimed are incorporated herein by reference, in order to take some protection against translation errors or omitted portions.

The scope of the present invention is defined with reference to the following claims.

What is claimed is:

1. A structure of mounting a cowl top cover which has a back end portion mounted to a lower end portion of a front windshield panel, the structure comprising:
   a surface portion disposed at the back end portion of the cowl top cover, the surface portion covering a surface of the lower end portion of the front windshield panel and extending in a vehicular widthwise direction;
   a plurality of clip portions disposed at the back end portion of the cowl top cover, the lower end portion of the front windshield panel being clamped between the clip portions and the surface portion in a plurality of places along the direction in which the surface portion extends; and
   a thin plate portion disposed at the back end portion of the cowl top cover, wherein the thin plate portion connecting the plurality of the clip portions with each other is thinner than the surface portion and is spaced apart from the front windshield panel.

2. The structure of mounting the cowl top cover as claimed in claim 1, wherein the thin plate portion has a water receiving portion for receiving a water which enters from outside.

3. The structure of mounting the cowl top cover as claimed in claim 2, wherein at least one of the plurality of the clip portions has a water draining hole for downwardly draining the water which is received in the water receiving portion.

4. The structure of mounting the cowl top cover as claimed in claim 3, wherein a lower end face of the at least one of the plurality of the clip portions protrudes more downwardly than a lower end face of the thin plate portion.

5. The structure of mounting the cowl top cover as claimed in claim 2, wherein
   at least one of the plurality of the clip portions includes:
      a clip body which is a member separated from the thin plate portion and has a contact portion adapted to contact the lower end portion of the front windshield panel, and a mounting portion integrated with the thin plate portion and to which the clip body is mounted, the contact portion of the clip body protrudes on the water receiving portion side of the thin plate portion, and the mounting portion has an opening opened in a direction same as a direction of an opening on the lower end portion side of the water receiving portion, and the clip body is inserted from the opening of the mounting portion.

6. The structure of mounting the cowl top cover as claimed in claim 2, wherein at least one of the plurality of clip portions has a clip body which is molded by a molding tool having a slide core moved from an opening side at the back end portion to form a space within the water receiving portion and which has a contact portion, the clip body is formed integrally with the thin plate portion, the contact portion contacts the lower end portion of the front windshield panel when the clip body is rotated with respect to the thin plate portion via a rotation connecting portion, and a reactive force receiving portion is included in the clip body which is rotated via the rotation connecting portion into the space within the water receiving portion so that the contact portion protrudes into the water receiving portion, and the reactive force receiving portion receives a reactive force from the front windshield panel when the lower end portion of the front windshield panel is clamped between the contact portion and the surface portion.

7. The structure of mounting the cowl top cover as claimed in claim 6, wherein the reactive force receiving portion is an engageable nail portion adapted to be engaged with the thin plate portion.

8. The structure of mounting the cowl top cover as claimed in claim 6, wherein the reactive force receiving portion is an opposing face which opposes the thin plate portion when the clip body is disposed on the thin plate portion after the clip body is rotated via the rotation connecting portion to the space side of the water receiving portion.

* * * * *